(12) United States Patent
Jeong et al.

(10) Patent No.: US 11,006,144 B2
(45) Date of Patent: May 11, 2021

(54) VIDEO DECODING METHOD AND APPARATUS AND VIDEO ENCODING METHOD AND APPARATUS

(71) Applicant: SAMSUNG ELECTRONICS CO., LTD., Suwon-si (KR)

(72) Inventors: Seungsoo Jeong, Suwon-si (KR); Minwoo Park, Suwon-si (KR); Yumi Sohn, Suwon-si (KR); Kiho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/934,228

(22) Filed: Jul. 21, 2020

(65) Prior Publication Data
US 2020/0351517 A1 Nov. 5, 2020

Related U.S. Application Data

(63) Continuation of application No. PCT/KR2019/002377, filed on Feb. 27, 2019.
(Continued)

(51) Int. Cl.
*H04N 19/53* (2014.01)
*H04N 19/109* (2014.01)
*H04N 19/176* (2014.01)

(52) U.S. Cl.
CPC .......... *H04N 19/53* (2014.11); *H04N 19/109* (2014.11); *H04N 19/176* (2014.11)

(58) Field of Classification Search
None
See application file for complete search history.

(56) References Cited

U.S. PATENT DOCUMENTS 9,930,358 B2 3/2018 Kim et al.
10,645,411 B2 5/2020 Lim et al.
(Continued)

FOREIGN PATENT DOCUMENTS

EP 3618435 A1 3/2020
KR 10-2012-0088611 A 8/2012
(Continued)

OTHER PUBLICATIONS

International Search Report and Written Opinion (PCT/ISA/210 and PCT/ISA/237), dated Jun. 20, 2019 by International Searching Authority in International Application No. PCT/KR2019/002377.
(Continued)

*Primary Examiner* — David N Werner
*Assistant Examiner* — Samuel D Fereja
(74) *Attorney, Agent, or Firm* — Sughrue Mion, PLLC

(57) ABSTRACT

Provided are a video encoding and decoding method and apparatus for obtaining, in a video encoding and decoding process, motion vector resolution information from a bit stream by using a high-level syntax which is a group of information that is applied to a predefined data unit group; determining a motion vector resolution of a current block included in the predefined data unit group based on the motion vector resolution information; determining a prediction motion vector of the current block to be a motion vector of a candidate block from among at least one candidate block, based on the motion vector resolution of the current block; and determining a motion vector of the current block by using the prediction motion vector of the current block.

5 Claims, 33 Drawing Sheets

Related U.S. Application Data

(60) Provisional application No. 62/636,438, filed on Feb. 28, 2018.

(56) References Cited

U.S. PATENT DOCUMENTS

| | | | |
|---|---|---|---|
| 2017/0295370 | A1 | 10/2017 | Xu et al. |
| 2017/0339426 | A1* | 11/2017 | Lee ........................ H04N 19/51 |
| 2018/0242004 | A1* | 8/2018 | Park ........................ H04N 19/52 |
| 2018/0278952 | A1 | 9/2018 | Han et al. |
| 2019/0320195 | A1* | 10/2019 | Lim ........................ H04N 19/52 |
| 2020/0186805 | A1* | 6/2020 | Lee ....................... H04N 19/122 |

FOREIGN PATENT DOCUMENTS

| | | |
|---|---|---|
| KR | 10-1441874 B1 | 9/2014 |
| KR | 10-2016-0087208 A | 7/2016 |
| KR | 10-1652072 B1 | 8/2016 |
| KR | 10-2017-0065542 A | 6/2017 |
| KR | 10-2017-0078673 A | 7/2017 |
| WO | 2019009504 A1 | 1/2019 |

OTHER PUBLICATIONS

Communication dated Nov. 10, 2020 by the Korean Intellectual Property Office in counterpart Korean Patent Application No. 10-2020-07024548.

* cited by examiner

FIG. 13

| DEPTH \ BLOCK SHAPE | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 21

1/4 - PEL UNIT

1/2 - PEL UNIT

1 - PEL UNIT

2 - PEL UNIT

FIG. 28

| CANDIDATE MOTION VECTOR RESOLUTION | CANDIDATE BLOCK |
|---|---|
| 1/8 PEL UNIT | LEFT BLOCK |
| 1/4 PEL UNIT | UPPER BLOCK |
| 1/2 PEL UNIT | LEFT, UPPER BLOCK |
| 1 PEL UNIT | UPPER, LEFT BLOCK |
| 2 PEL UNIT | LEFT, LOWER BLOCK |

FIG. 30

| MOTION VECTOR RESOLUTION | APPLICABLE PROCESSING MODE |
|---|---|
| 1/4 PEL UNIT | Affine PROCESSING MODE |
| 1/2 PEL UNIT<br>1 PEL UNIT<br>2 PEL UNIT | DMVD PROCESSING MODE |

FIG. 31

| MOTION VECTOR RESOLUTION | NON-APPLICABLE PROCESSING MODE |
|---|---|
| 1/4 PEL UNIT | DST PROCESSING MODE |
| 1/2 PEL UNIT<br>1 PEL UNIT<br>2 PEL UNIT | ROT PROCESSING MODE |

FIG. 32

| MOTION VECTOR RESOLUTION | APPLICABLE PROCESSING MODE | NON-APPLICABLE PROCESSING MODE |
|---|---|---|
| 1/4 PEL UNIT | Affine PROCESSING MODE, IC PROCESSING MODE | BF PROCESSING MODE |
| 1/2 PEL UNIT<br>1 PEL UNIT<br>2 PEL UNIT | ROT PROCESSING MODE | OBMC PROCESSING MODE, SAO PROCESSING MODE |

VIDEO DECODING METHOD AND APPARATUS AND VIDEO ENCODING METHOD AND APPARATUS

TECHNICAL FIELD

The disclosure relates to a video decoding method and apparatus, and more particularly, to a method and apparatus for encoding an image based on a motion vector resolution, and a method and apparatus for decoding an image.

BACKGROUND ART

In a video encoding and decoding method, a picture is split into macro blocks, and each macro block is prediction-encoded through inter prediction or intra prediction, in order to encode an image.

The inter prediction is a method of removing temporal redundancy between pictures to compress an image. A representative example of the inter prediction is motion estimation coding. The motion estimation coding predicts blocks of a current picture using a reference picture. A reference block that is most similar to a current block is searched within a predefined search range by using a predefined evaluation function.

The current block is predicted based on the reference block, and a prediction block generated as the result of the prediction is subtracted from the current block to generate a residual block. The residual block is then encoded. To more accurately perform the prediction, interpolation is performed on the search range of the reference picture to generate pixels in a sub pel unit that is smaller than an integer pel unit, and inter prediction is performed based on the pixels in the sub pel unit.

In a codec, such as H.264 Advanced Video Coding (AVC) and High Efficiency Video Coding (HEVC), motion vectors of previously encoded blocks being adjacent to a current block or blocks included in a previously encoded picture are used as prediction motion vectors of the current block in order to predict a motion vector of the current block (Motion Vector Prediction).

DESCRIPTION OF EMBODIMENTS

Technical Problem

To apply Adaptive Motion Vector Resolution (AMVR) in a process for video encoding and decoding, a method and apparatus for using motion vector resolution information of a high-level syntax which is a group of information applied to a predefined data unit group are proposed. More specifically, a method and apparatus for applying AMVR to a current block included in a high-level unit (a unit of a sequence, a picture, a slice, or a tile) using motion vector resolution information signaled to a high-level syntax are proposed.

Solution to Problem

To overcome the above-described technical problem, a video decoding method proposed in the disclosure includes: obtaining motion vector resolution information from a bit stream by using a high-level syntax including a group of information applied to a predefined data unit group; determining a motion vector resolution of a current block included in the predefined data unit group based on the motion vector resolution information; determining a prediction motion vector of the current block to be a motion vector of a candidate block from among at least one candidate block, based on the motion vector resolution of the current block; and determining a motion vector of the current block by using the prediction motion vector of the current block.

To overcome the above-described technical problem, a video decoding apparatus proposed in the disclosure includes: a memory; and at least one processor connected to the memory, wherein the at least one processor is configured to obtain motion vector resolution information from a bit stream by using a high-level syntax including a group of information applied to a predefined data unit group, determine a motion vector resolution of a current block included in the predefined data unit group based on the motion vector resolution information, determine a prediction motion vector of the current block to be a motion vector of a candidate block from among at least one candidate block, based on the motion vector resolution of the current block, and determine a motion vector of the current block by using the prediction motion vector of the current block.

To overcome the above-described technical problem, a video encoding method proposed in the disclosure includes: performing motion prediction on a current block to determine a motion vector and a motion vector resolution of the current block; determining a prediction motion vector of the current block to be a motion vector from among at least one candidate block, based on the motion vector resolution; determining a residual motion vector of the current block by using the prediction motion vector of the current block; and encoding the motion vector resolution information representing the motion vector resolution with a high-level syntax which is a group of information that is applied to a predefined data unit group, and encoding the residual motion vector of the current block.

To overcome the above-described technical problem, a video encoding apparatus proposed in the disclosure includes: a memory; and at least one processor connected to the memory, wherein the at least one processor is configured to: perform motion prediction on a current block to determine a motion vector and a motion vector resolution of the current block; determine a prediction motion vector of the current block to be a motion vector from among at least one candidate block, based on the motion vector resolution; determine a residual motion vector of the current block by using the prediction motion vector of the current block; and encode the motion vector resolution information representing the motion vector resolution with a high-level syntax which is a group of information that is applied to a predefined data unit group, and encode the residual motion vector of the current block.

Advantageous Effects of Disclosure

By using information of a high-level syntax, such as a sequence level, a picture level, a slice level, or a tile level, etc., to apply Adaptive Motion Vector Resolution (AMVR) in a process for video encoding and decoding, a bit rate may be saved and encoding efficiency and performance may be improved.

BRIEF DESCRIPTION OF DRAWINGS

FIG. 13 illustrates a process of determining a depth of a coding unit when a shape and size of the coding unit change, when the coding unit is recursively split such that a plurality of coding units are determined, according to an embodiment.

FIG. 21 illustrates an interpolation method for determining motion vectors according to various motion vector resolutions.

FIG. 28 illustrates an example of a mapping relationship between at least one candidate motion vector resolution and at least one candidate block.

FIG. 30 illustrates an example of applicable processing modes or non-applicable processing modes predefined for MVRs.

FIG. 31 illustrates an example of applicable processing modes or non-applicable processing modes predefined for MVRs.

FIG. 32 illustrates an example of applicable processing modes or non-applicable processing modes predefined for MVRs.

BEST MODE

Figure 1:
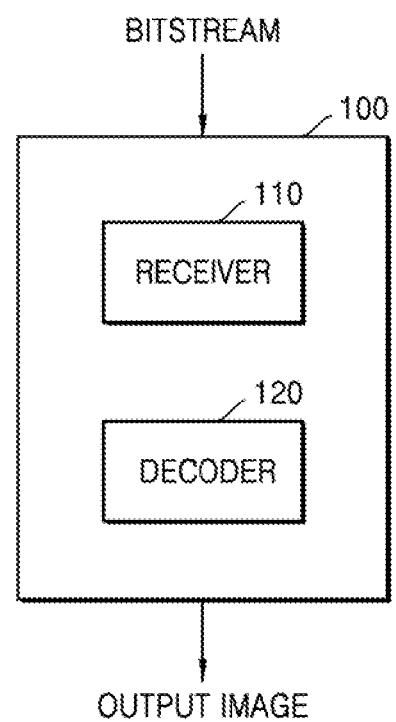
FIG. 1 is a schematic block diagram of an image decoding apparatus according to an embodiment.

A video decoding method according to an embodiment proposed in the disclosure includes: obtaining motion vector resolution information from a bit stream by using a high-level syntax which is a group of information that is applied to a predefined data unit group; determining a motion vector resolution of a current block included in the predefined data unit group based on the motion vector resolution information; determining a prediction motion vector of the current block to be a motion vector from among a candidate block of at least one candidate block, based on the motion vector resolution of the current block; and determining a motion vector of the current block by using the prediction motion vector of the current block.

According to an embodiment, when a candidate motion vector resolution of the candidate block is different from the motion vector resolution of the current block, the video decoding method may further include determining the prediction motion vector of the current block by adjusting the motion vector of the candidate block.

According to an embodiment, the motion vector resolution information includes start resolution location information, and the video decoding method may further include: determining at least one motion vector resolution index from a predefined motion vector set including a plurality of resolutions sequentially arranged, based on the start resolution location information; and determining the motion vector resolution of the current block, based on the at least one motion vector resolution index.

According to an embodiment, the motion vector resolution information may include motion vector resolution set information, and the video decoding method may further include: determining a motion vector resolution set of a plurality of motion vector resolution sets, based on the motion vector resolution set information; and determining the motion vector resolution of the current block, based on at least one motion vector resolution index determined based on the motion vector resolution set.

According to an embodiment, the motion vector resolution information may include at least one motion vector resolution index respectively corresponding to at least one motion vector resolution, and the video decoding method may further include determining the motion vector resolution of the current block, based on the at least one motion vector resolution index.

According to an embodiment, the video decoding method may further include: obtaining information about whether or not to use an absolute value of a difference between a reference frame Picture Order Count (POC) and a current frame POC from the bit stream by using the high-level syntax; and determining the motion vector resolution of the current block, based on the absolute value of the difference between the reference frame POC and the current frame POC and a predefined threshold value.

According to an embodiment, the motion vector resolution information may include information about a maximum number of motion vector resolution indices.

According to an embodiment, the motion vector resolution information may include information about a difference between the number of motion vector resolution indices and a predefined minimum number of motion vector resolution indices.

According to an embodiment, the predefined minimum number of the motion vector resolution indices may be classified according to temporal layers.

According to an embodiment, the video decoding method may further include: obtaining configuration information for a motion vector candidate list from the bit stream by using the high-level syntax, wherein the configuration information for the motion vector candidate list represents whether or not to use at least one of a candidate motion vector list for at least one candidate block of the current block and a motion vector list of predefined blocks respectively corresponding to candidate motion vector resolutions of the current block; and determining the motion vector of the current block, based on the configuration information for the motion vector candidate list.

According to an embodiment, the video decoding method may further include: obtaining information about whether or not to execute at least one processing mode according to the motion vector resolution of the current block from a plurality of processing modes included in at least one processing among prediction processing, transform processing, and filtering processing for decoding the current block, from the bit stream, by using the high-level syntax; and decoding the current block based on the information about whether or not to execute the at least one processing mode.

According to an embodiment, the information about whether or not to execute the at least one processing mode may include default setting changing information, and the video decoding method may further include updating the information about whether or not to execute the at least one processing mode when the default setting changing information represents that whether or not to execute the at least one processing mode changes.

According to an embodiment, the high-level syntax may be one of a sequence level syntax, a picture level syntax, a slice level syntax, and a tile level syntax.

A video encoding method according to an embodiment proposed in the disclosure includes: performing motion prediction on a current block to determine a motion vector and a motion vector resolution of the current block; determining a motion vector of at least one candidate block as a prediction motion vector of the current block, based on the motion vector resolution; determining a residual motion vector of the current block by using the prediction motion vector of the current block; and encoding the motion vector resolution information representing the motion vector resolution with a high-level syntax which is a group of information that is applied to a predefined data unit group, and encoding the residual motion vector of the current block.

A video decoding apparatus according to an embodiment proposed in the disclosure includes: a memory; and at least one processor connected to the memory, wherein the at least one processor is configured to obtain motion vector resolution information from a bit stream by using a high-level syntax which is a group of information that is applied to a predefined data unit group, determine a motion vector resolution of a current block included in the predefined data unit group based on the motion vector resolution information, determine a prediction motion vector of the current block to be a motion vector from among a candidate block of at least one candidate block, based on the motion vector resolution of the current block, and determine a motion vector of the current block by using the prediction motion vector of the current block.

Mode of Disclosure

Advantages and features of one or more embodiments and methods of accomplishing the same may be understood more readily by reference to the embodiments and the accompanying drawings. In this regard, the embodiments of the disclosure may have different forms and should not be construed as being limited to the descriptions set forth herein. Rather, these embodiments are provided so that this disclosure will be thorough and complete and will fully convey the concept of the present embodiments of the disclosure to one of ordinary skill in the art.

The terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following description, terms such as "unit" indicate a software or hardware component and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some circumstances, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, a register, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform region may be samples. A unit including at least one such sample may be defined as a block.

Also, in the present specification, a 'current block' may mean a block of a maximum encoding unit, an encoding unit, a prediction unit, or a transform unit of a current image that is to be encoded or decoded.

Also, in the present specification, a 'motion vector resolution' may mean precision of a location of a pixel which may be indicated by a motion vector determined through inter prediction, among pixels included in a reference image (or an interpolated reference image). That a motion vector resolution has a N pel unit (N is a rational number) means that the motion vector may have precision of a N pel unit. For example, a motion vector resolution of a ¼ pel unit may mean that the motion vector may indicate a pixel location of the ¼ pel unit (that is, a sub pel unit) in an interpolated reference image, and a motion vector resolution of a 1 pel unit may mean that the motion vector may indicate a pixel location corresponding to the 1 pel unit (that is, an integer pel unit) in an interpolated reference image.

Also, in the present specification, a 'candidate motion vector resolution' means at least one motion vector resolution that may be selected as a motion vector resolution of a block, and a 'candidate block' means at least one block that may be used as a block for a prediction motion vector of a block mapped to a candidate motion vector resolution and inter-predicted.

Also, in the present specification, a 'pel unit' may be referred to as pixel precision, pixel accuracy, or the like.

Hereinafter, embodiments will be described in detail with reference to the accompanying drawings such that one of ordinary skill in the art may easily implement the embodiments. In the drawings, parts irrelevant to the description are omitted to clearly describe the present disclosure.

Hereinafter, an image encoding apparatus and an image decoding apparatus, and an image encoding method and an image decoding method according to embodiments will be described with reference to FIGS. 1 to 16. A method of determining a data unit of an image, according to an embodiment, will be described with reference to FIGS. 3 to 16, and a video decoding method of obtaining motion vector resolution information using a high-level syntax which is a group of information that is applied to a predefined data unit group, determining a motion vector resolution of a current block included in the predefined data unit group based on the motion vector resolution information, determining a motion vector of a candidate block of at least one candidate block as a prediction motion vector of the current block based on the motion vector resolution of the current block, and determining a motion vector of the current block by using the prediction motion vector of the current block, according to an embodiment, will be described with reference to FIGS. 17 to 32.

Hereinafter, a method and apparatus for adaptively selecting a context model, based on various shapes of coding units, according to an embodiment of the disclosure, will be described with reference to FIGS. 1 and 2.

FIG. 1 is a schematic block diagram of an image decoding apparatus according to an embodiment.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described later. Also, the bitstream may be transmitted from the image encoding apparatus 2200. The image encoding apparatus 2200 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
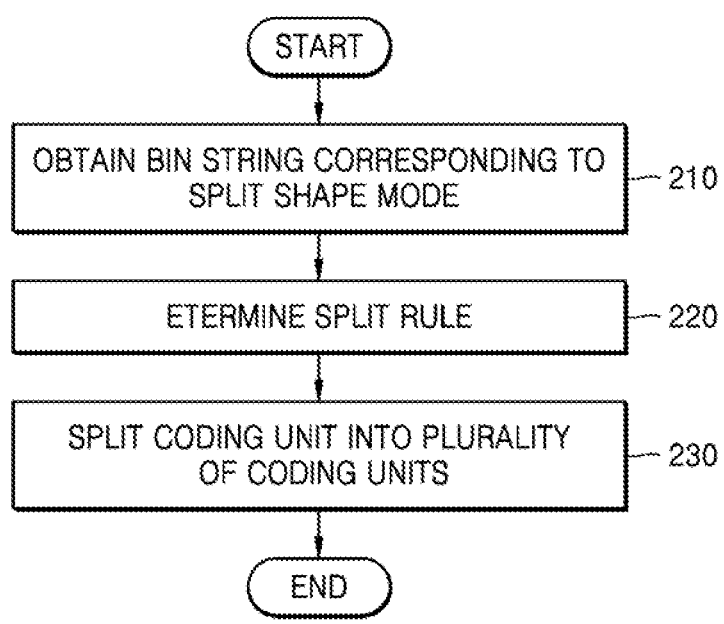
FIG. 2 is a flowchart of an image decoding method according to an embodiment.

FIG. 2 is a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, a picture may be split into at least one slice or at least one tile. A slice or tile may be a sequence of at least one Coding Tree Unit (CTU). As a concept contrasted with the CTU, there is a Coding Tree Block (CTB).

The largest coding unit (CTB) denotes an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a predefined size including a predefined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split in 2 may be obtained from a bitstream. The information about the luma block size difference may refer to a size difference between a luma largest coding unit and a largest luma coding block that may be split in 2. Accordingly, when the information about the maximum size of the luma coding block that may be split in 2 and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, a maximum size of a luma coding block that may be ternary split in an I picture may be 32×32, and a maximum size of a luma block that may be ternary split in a P picture or a B picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER.

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
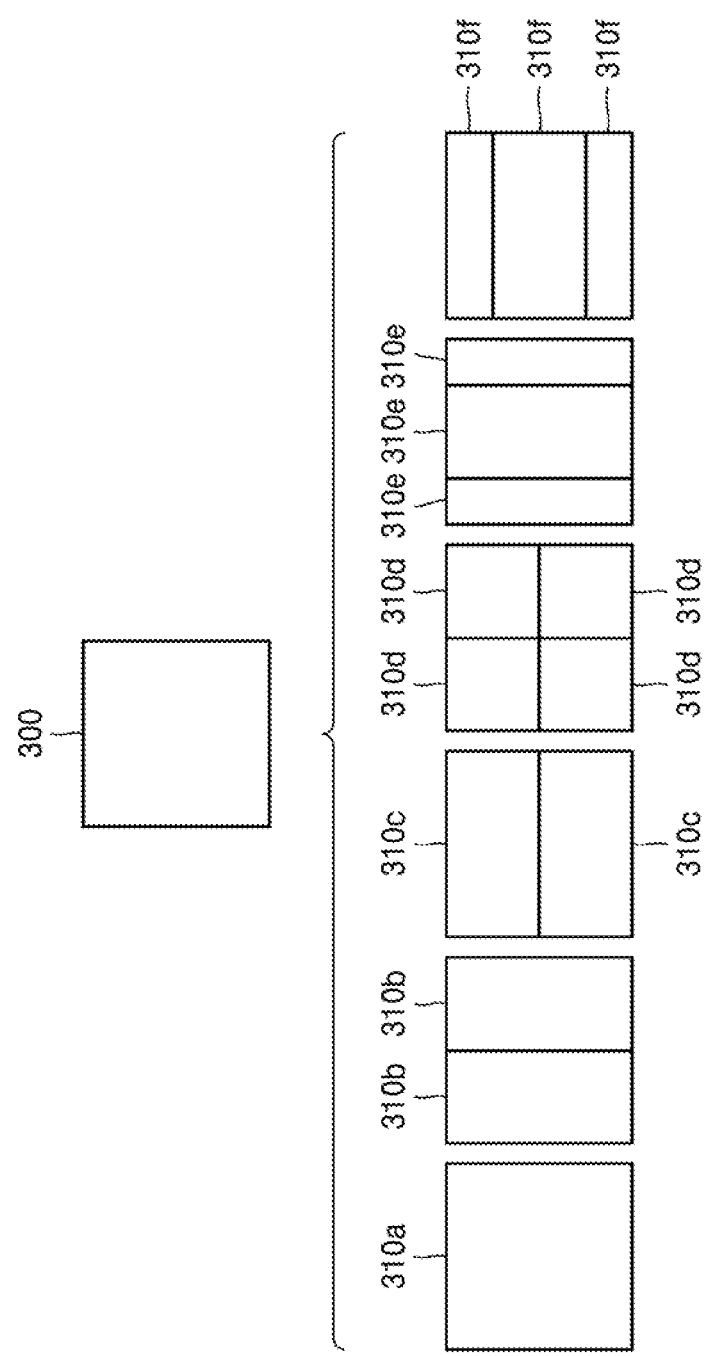
FIG. 3 illustrates a process, performed by an image decoding apparatus, of determining at least one coding unit by splitting a current coding unit, according to an embodiment.

FIG. 3 illustrates a process, performed by the image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height in the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310*a* having the same size as the current coding unit 300 is not split, based on the split shape mode information indicating not to perform splitting, or may determine coding units 310*b*, 310*c*, 310*d*, 310*e*, 310*f*, or the like which are split based on the split shape mode information indicating a predefined splitting method.

Referring to FIG. 3, according to an embodiment, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. According to an embodiment, the image decoding apparatus 100 may determine three coding units 310*e* obtained by splitting the current coding unit 300 in a vertical direction, based on the split shape mode information indicating to perform ternary-splitting in a vertical direction. The image decoding apparatus 100 may determine three coding units 310*f* obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Predefined splitting methods of splitting the square coding unit will be described in detail below in relation to various embodiments.

Figure 4:
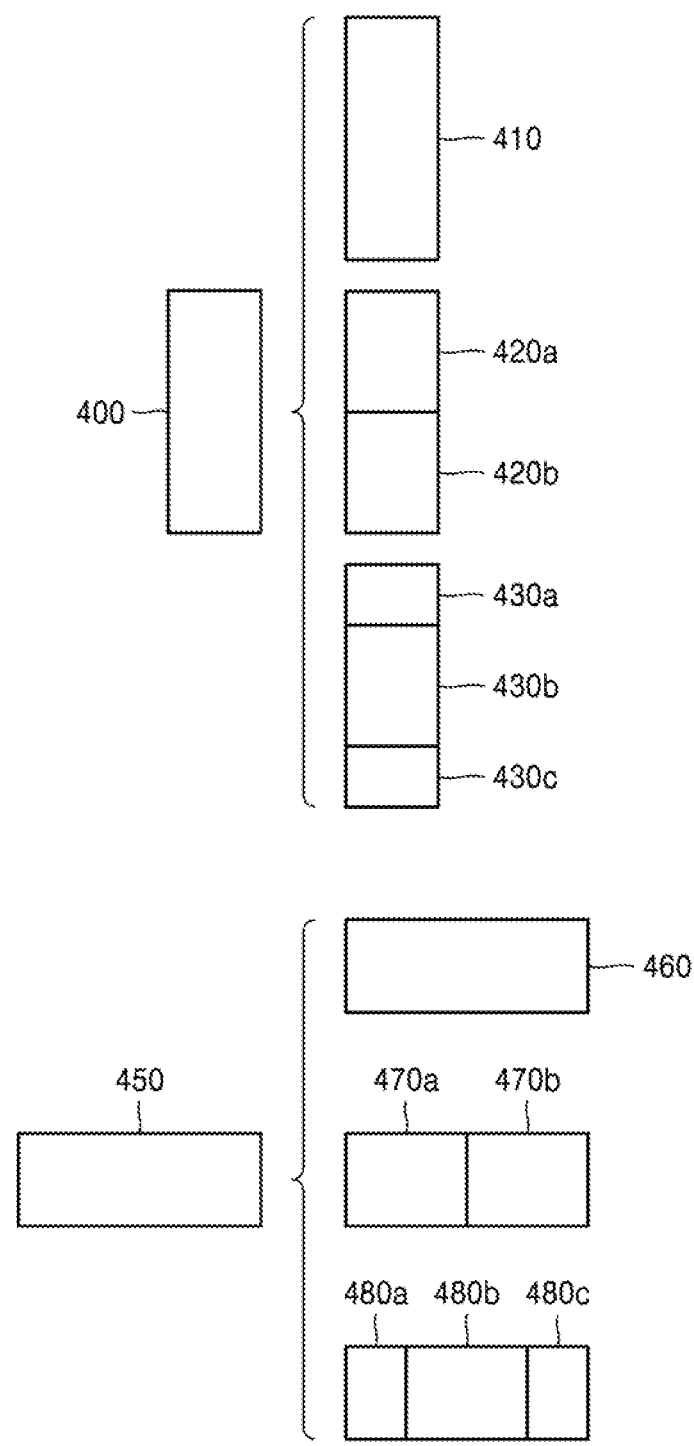
FIG. 4 illustrates a process, performed by an image decoding apparatus, of determining at least one coding unit by splitting a non-square coding unit, according to an embodiment.

FIG. 4 illustrates a process, performed by the image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predefined splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating not to perform splitting, or determine coding units 420*a* and 420*b*, 430*a* to 430*c*, 470*a* and 470*b*, or 480*a* to 480*c* split based on the split shape mode information indicating a predefined splitting method. Predefined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a* to 430*c* by splitting the current coding unit 400 in the horizontal direction. Also, when the current coding unit 450 is in the horizontal direction, the image decoding apparatus 100 may determine the coding units 480*a* to 480*c* by splitting the current coding unit 450 in the vertical direction.

According to an embodiment, the image decoding apparatus 100 may determine the odd number of coding units included in the current coding unit 400 or 450, and not all the determined coding units may have the same size. For example, a predefined coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a predefined restriction on at least one coding unit from among the odd number of coding units generated by splitting the current coding unit 400 or 450. Referring to FIG. 4, the image decoding apparatus 100 may allow a decoding process of the coding unit 430b or 480b to be different from that of the other coding units 430a and 430c, or 480a or 480c, wherein the coding unit 430b or 480b is at a center location from among the three coding units 430a, 430b, and 430c or 480a, 480b, and 480c generated by splitting the current coding unit 400 or 450. For example, the image decoding apparatus 100 may restrict the coding unit 430b or 480b at the center location to be no longer split or to be split only a predefined number of times, unlike the other coding units 430a and 430c, or 480a and 480c.

Figure 5:
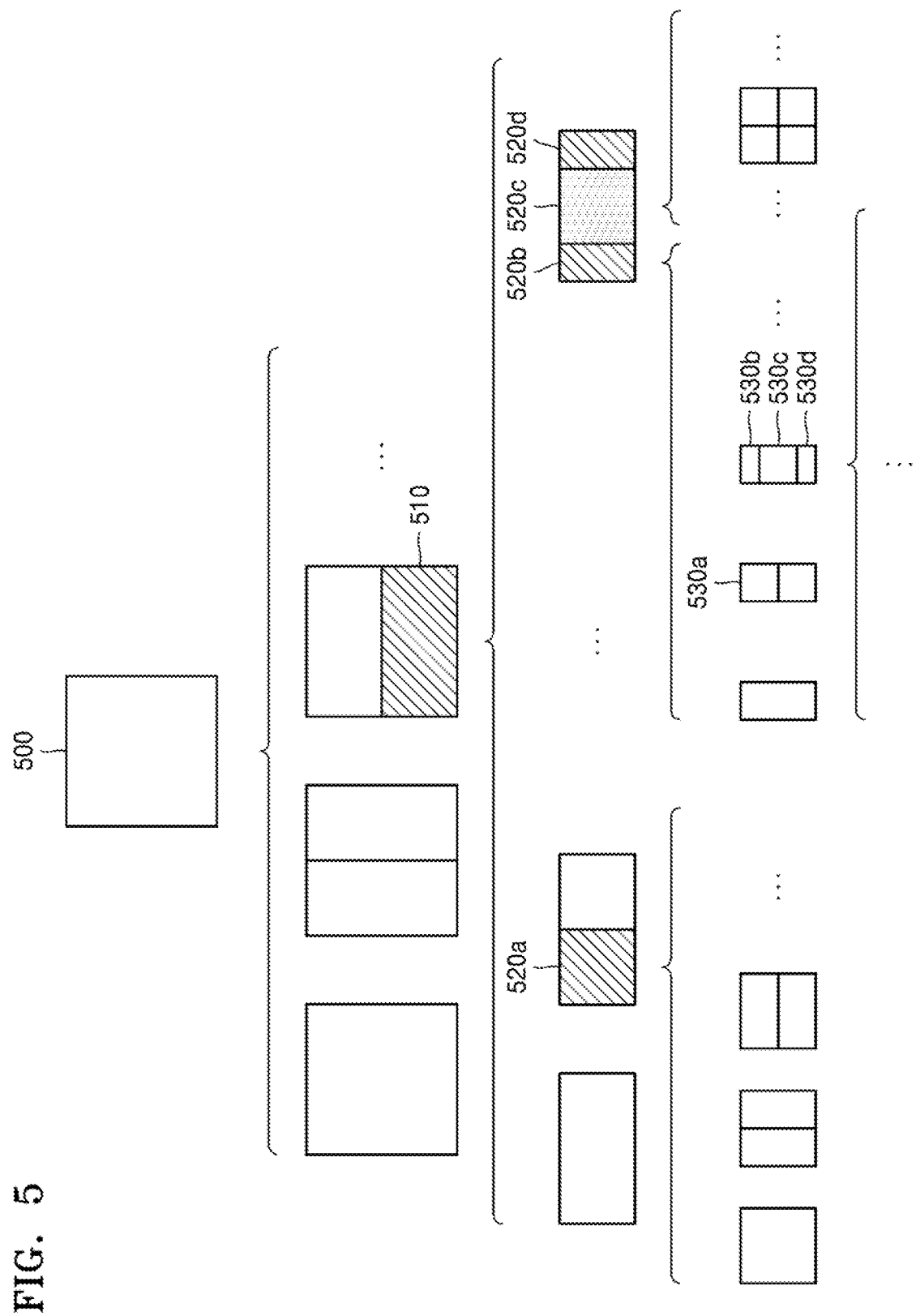
FIG. 5 illustrates a process, performed by an image decoding apparatus, of splitting a coding unit based on at least one of block shape information and split shape mode information, according to an embodiment.

FIG. 5 illustrates a process, performed by the image decoding apparatus, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, or 520b, 520c, and 520d based on the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predefined coding unit from among the odd number of third coding units 520b, 520c, and 520d determined by splitting the non-square second coding unit 510 (e.g., a coding unit or a square coding unit, which is located at a center location) may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be split into a plurality of coding units again. For example, the non-square fourth coding unit 530b or 530d may be split into the odd number of coding units again. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a predefined restriction on a predefined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predefined splitting method (e.g., split into only four coding units or split by using a splitting method of the second coding unit 510), or to be split only a predefined number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a predefined location in the current coding unit.

Figure 6:
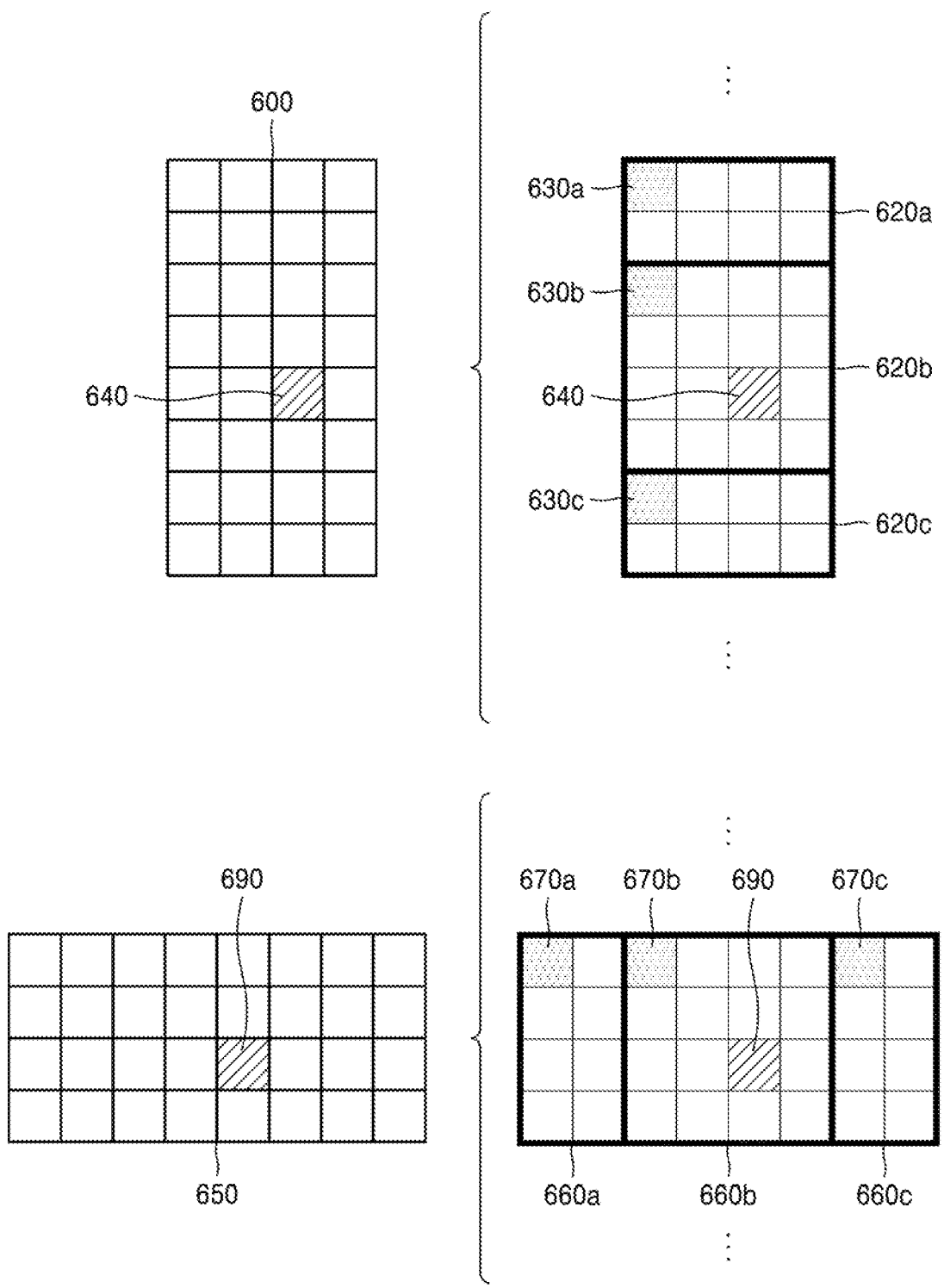
FIG. 6 illustrates a method, performed by an image decoding apparatus, of determining a predefined coding unit from among an odd number of coding units, according to an embodiment.

FIG. 6 illustrates a method, performed by the image decoding apparatus, of determining a predefined coding unit from among an odd number of coding units, according to an embodiment.

Referring to FIG. 6, split shape mode information of a current coding unit 600 or 650 may be obtained from a sample of a predefined location (e.g., a sample 640 or 690 of a center location) from among a plurality of samples included in the current coding unit 600 or 650. However, the predefined location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the predefined location and may determine to split or not to split the current coding unit into various-shaped and various-sized coding units.

According to an embodiment, when the current coding unit is split into a predefined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predefined location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predefined samples included in the coding units 620a, 620b, and 620c. In detail, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment, the information indicating the locations of the upper left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a predefined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predefined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the predefined location. However, the above-described method, performed by the image decoding apparatus 100, of determining a coding unit having a size different from the size of the other coding units merely corresponds to an example of determining a coding unit at a predefined location by using the sizes of coding units, which are determined based on coordinates of samples, and thus various methods of determining a coding unit at a predefined location by comparing the sizes of coding units, which are determined based on coordinates of predefined samples, may be used.

The image decoding apparatus 100 may determine the width or height of each of the coding units 660a, 660b, and 660c by using the coordinates (xd, yd) that is information indicating the location of a upper left sample 670a of the left coding unit 660a, the coordinates (xe, ye) that is information indicating the location of a upper left sample 670b of the middle coding unit 660b, and the coordinates (xf, yf) that is information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the predefined location. However, the above-described method, performed by the image decoding apparatus 100, of determining a coding unit having a size different from the size of the other coding units merely corresponds to an example of determining a coding unit at a predefined location by using the sizes of coding units, which are determined based on coordinates of samples, and thus various methods of determining a coding unit at a predefined location by comparing the sizes of coding units, which are determined based on coordinates of predefined samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a predefined location from among an odd number of coding units determined by splitting the current coding unit, in consideration the shape of the current coding unit. For example, when the current coding unit has a non-square shape, a width of which is longer than a height, the image decoding apparatus 100 may determine the coding unit at the predefined location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the predefined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predefined location from among the even number of coding units. The image decoding apparatus 100 may determine an even number of coding units by splitting (binary-splitting) the current coding unit, and may determine the coding unit at the predefined location by using the information about the locations of the even number of coding units. An operation related thereto may correspond to the operation of determining a coding unit at a predefined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predefined information about a coding unit at a predefined location may be used in a splitting operation to determine the coding unit at the predefined location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, predefined information for identifying the coding unit at the predefined location may be obtained from a predefined sample included in a coding unit to be determined. Referring to FIG. 6, the image decoding apparatus 100 may use the split shape mode information, which is obtained from a sample at a predefined location in the current coding unit 600 (e.g., a sample at a center location of the current coding unit 600) to determine a coding unit at a predefined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predefined location by considering a block shape of the current coding unit 600, may determine the coding unit 620b including a sample, from which predefined information (e.g., the split shape mode information) is obtainable, from among the plurality of coding units 620a, 620b, and 620c determined by splitting the current coding unit 600, and may put a predefined restriction on the coding unit 620b. Referring to FIG. 6, according to an embodiment, the image decoding apparatus 100 may determine the sample 640 at the center location of the current coding unit 600 as the sample from which the predefined information may be obtained, and may put a predefined restriction on the coding unit 620b including the sample 640, in a decoding operation. However, the location of the sample from which the predefined information is obtainable is not limited to the above-described location, and may include arbitrary locations of samples included in the coding unit 620b to be determined for a restriction.

According to an embodiment, the location of the sample from which the predefined information is obtainable may be determined based on the shape of the current coding unit 600. According to an embodiment, the block shape information may indicate whether the current coding unit has a square or non-square shape, and the location of the sample from which the predefined information is obtainable may be determined based on the shape. For example, the image decoding apparatus 100 may determine a sample located on a boundary for splitting at least one of a width and height of the current coding unit in half, as the sample from which the predefined information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predefined information is obtainable.

According to an embodiment, when the current coding unit is split into a plurality of coding units, the image decoding apparatus 100 may use the split shape mode information to determine a coding unit at a predefined location from among the plurality of coding units. According to an embodiment, the image decoding apparatus 100 may obtain the split shape mode information from a sample at a predefined location in a coding unit, and may split the plurality of coding units, which are generated by splitting the current coding unit, by using the split shape mode information, which is obtained from the sample of the predefined location in each of the plurality of coding units. That is, a coding unit may be recursively split based on the split shape mode information, which is obtained from the sample at the predefined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predefined block (e.g., the current coding unit).

Figure 7:
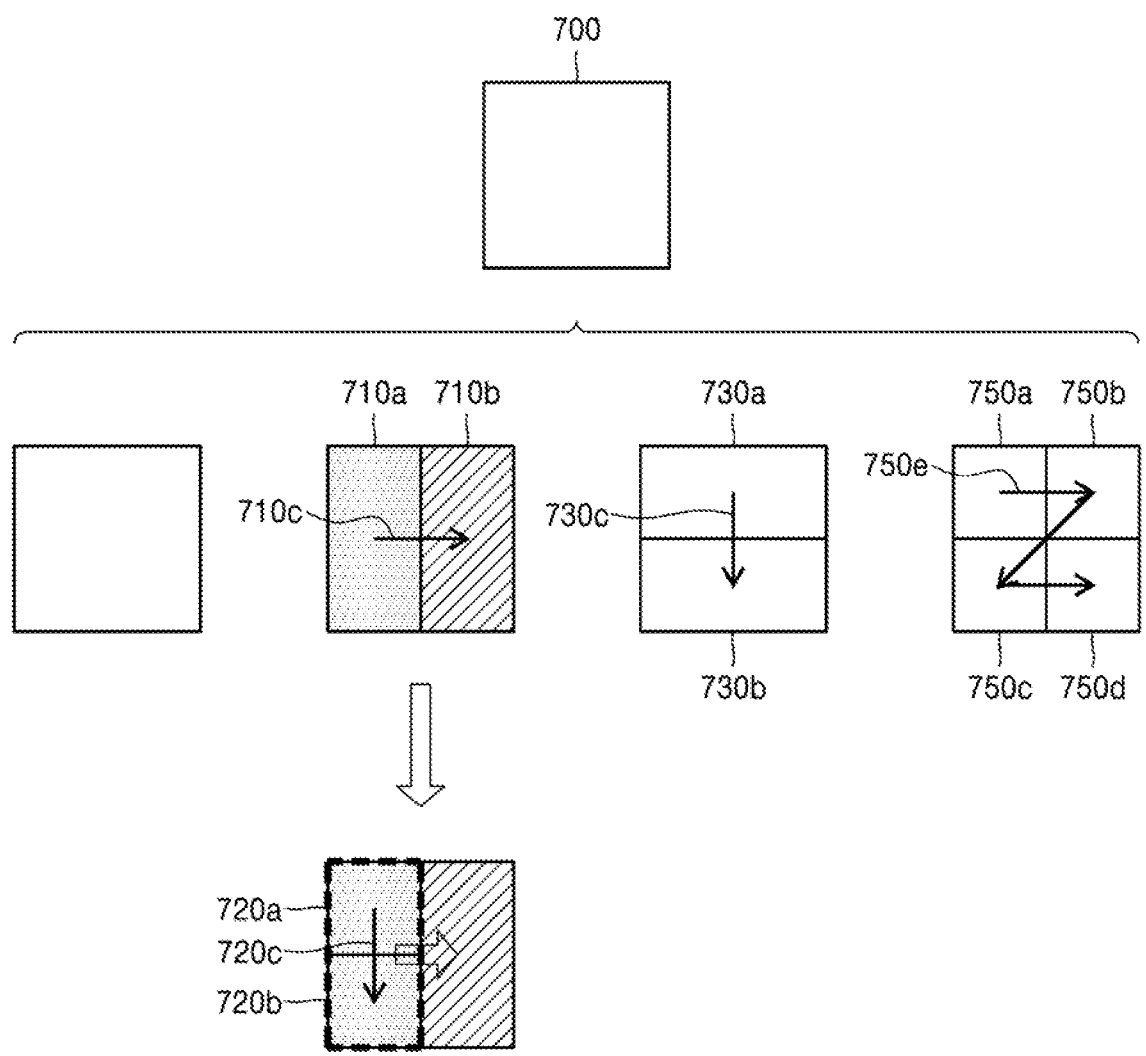
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, according to a predefined order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a and 710b, 730a and 730b, or 750a, 750b, 750c, and 750d. A splitting method of the plurality of coding units 710a and 710b, 730a and 730b, or 750a, 750b, 750c, and 750d may correspond to a splitting method of the first coding unit 700. As such, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predefined order.

Figure 8:
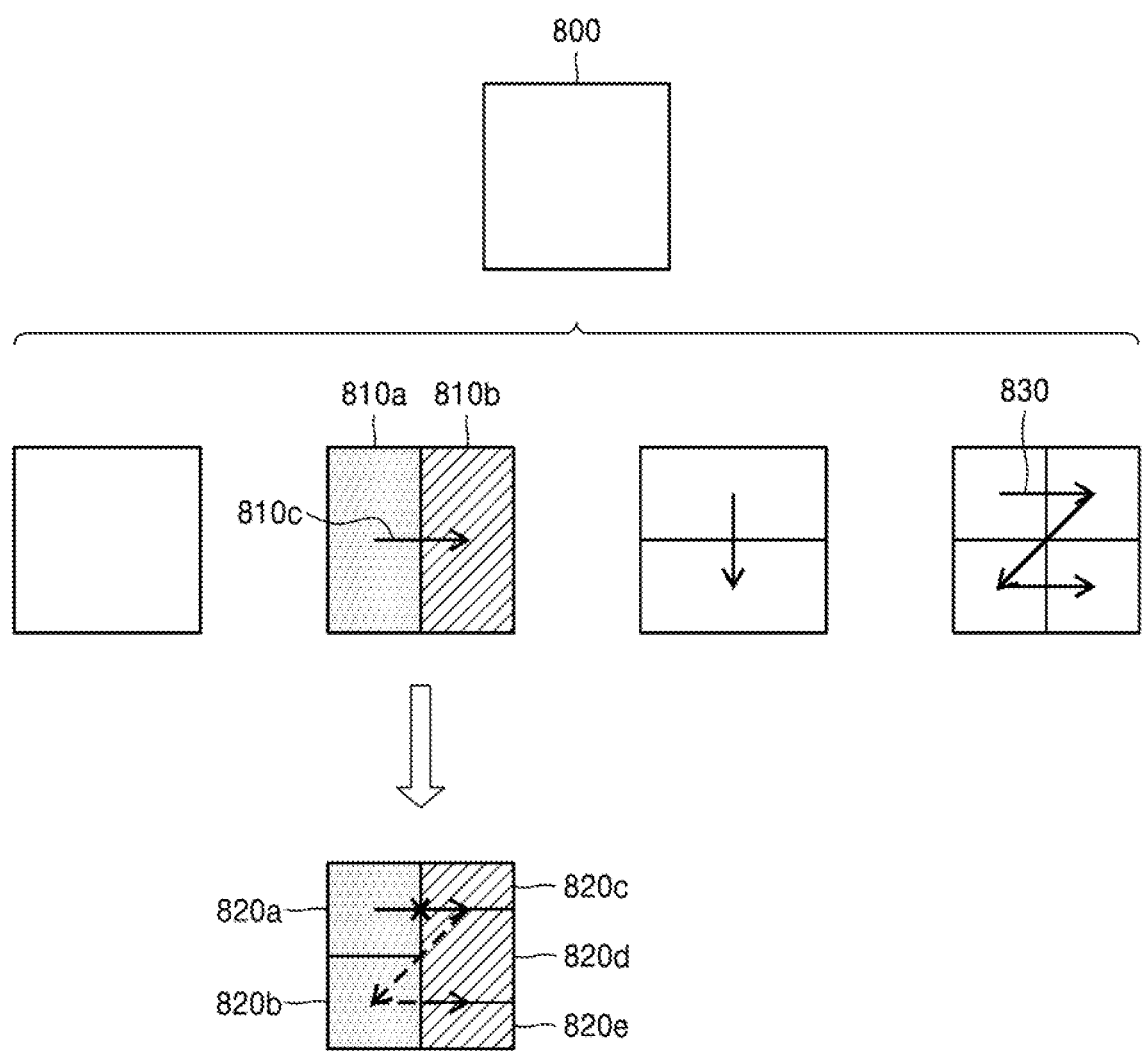
FIG. 8 illustrates a process, performed by an image decoding apparatus, of determining that a current coding unit is to be split into an odd number of coding units, when the coding units are not processable in a predefined order, according to an embodiment.

FIG. 8 illustrates a process, performed by the image decoding apparatus, of determining that a current coding unit is to be split into an odd number of coding units, when the coding units are not processable in a predefined order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether any coding unit that is split into an odd number of coding units exists, by determining whether the third coding units 820a and 820b, and 820c, 820d, and 820e are processable in a predefined order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, and the third coding units 820a and 820b, and 820c, 820d, and 820e are to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a predefined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predefined order.

According to an embodiment, the image decoding apparatus 100 may determine whether the third coding units 820a and 820b, and 820c, 820d, and 820e included in the first coding unit 800 satisfy the condition for processing in the predefined order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a predefined restriction on a coding unit at a predefined location from among the split coding units. The restriction or the predefined location has been described above in relation to various embodiments, and thus detailed descriptions thereof will not be provided herein.

Figure 9:
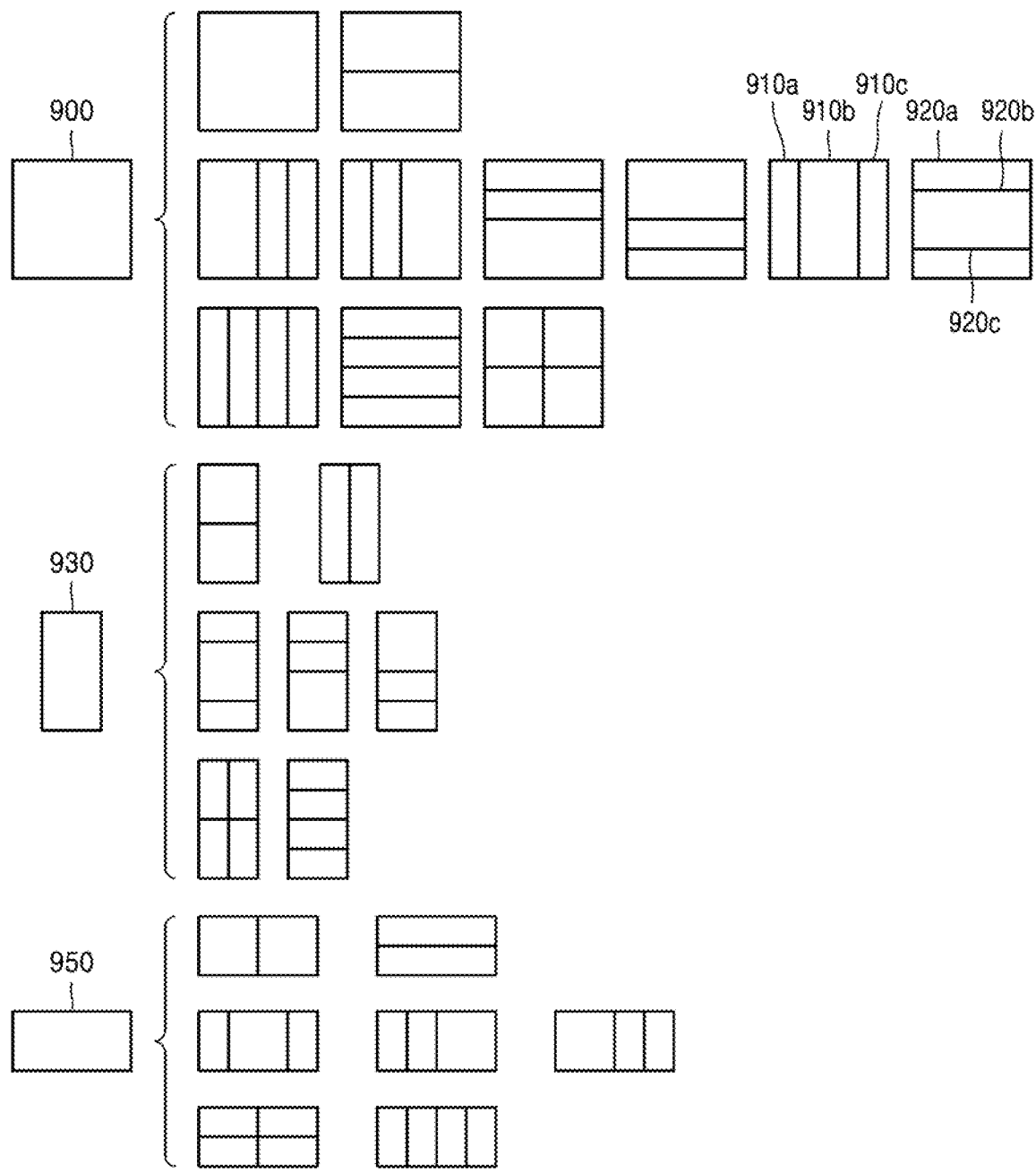
FIG. 9 illustrates a process, performed by an image decoding apparatus, of determining at least one coding unit by splitting a first coding unit, according to an embodiment.

FIG. 9 illustrates a process, performed by the image decoding apparatus, of determining at least one coding unit by splitting a first coding unit, according to an embodiment.

According to an embodiment, the image decoding apparatus 100 may split a first coding unit 900, based on split shape mode information which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predefined order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predefined order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the predefined order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a predefined restriction on a coding unit at a predefined location from among the split coding units. The restriction or the predefined location has been described above with reference to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
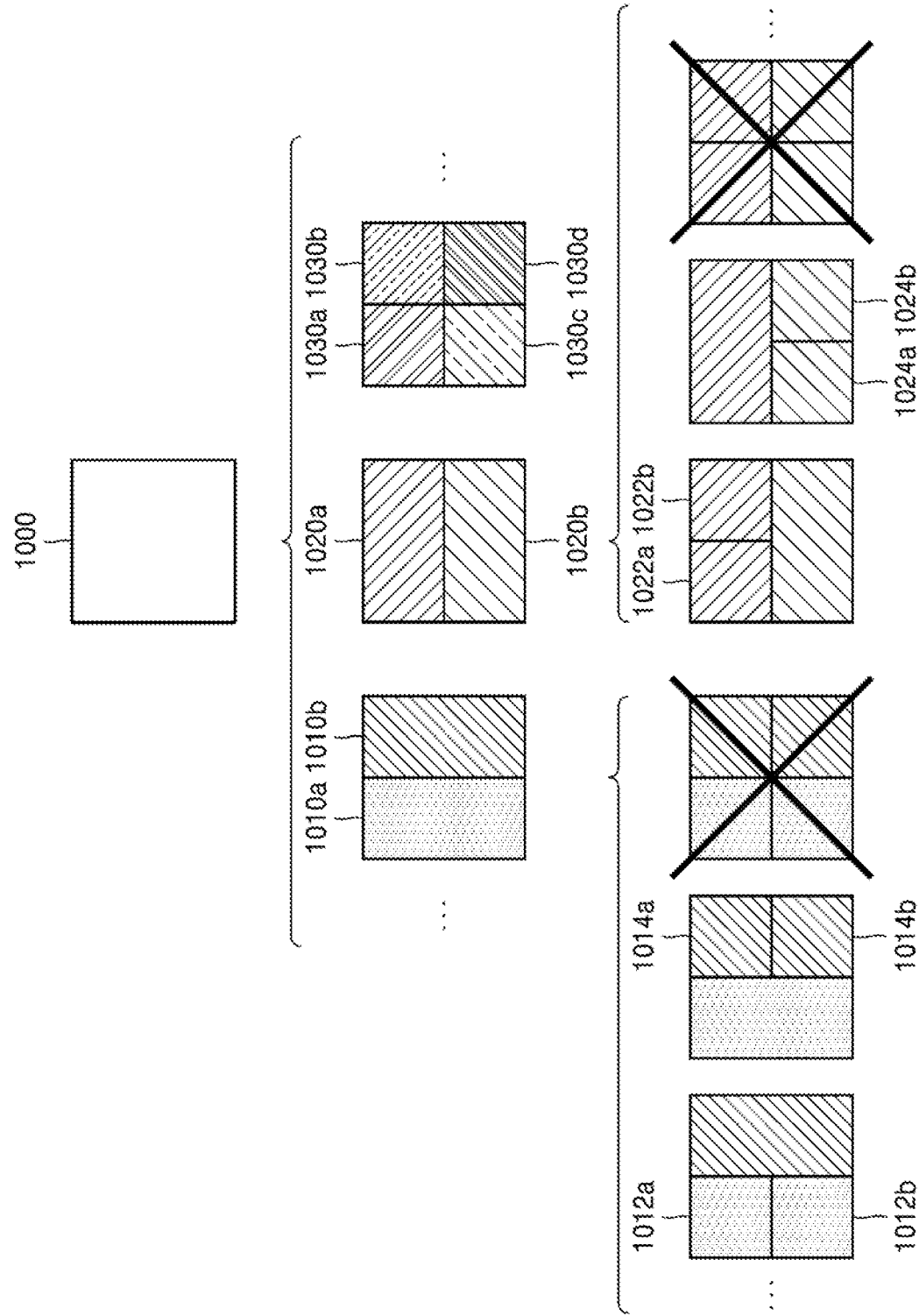
FIG. 10 illustrates that a shape into which a second coding unit is splittable is restricted when the second coding unit having a non-square shape, which is determined when an image decoding apparatus splits a first coding unit, satisfies a predefined condition, according to an embodiment.

FIG. 10 illustrates that a shape into which a second coding unit is splittable is restricted when the second coding unit having a non-square shape, which is determined as the image decoding apparatus 100 splits a first coding unit 1000, satisfies a predefined condition, according to an embodiment.

According to an embodiment, the image decoding apparatus 100 may determine to split the square first coding unit 1000 into non-square second coding units 1010a and 1010b or 1020a and 1020b, based on split shape mode information, which is obtained by the receiver 110. The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
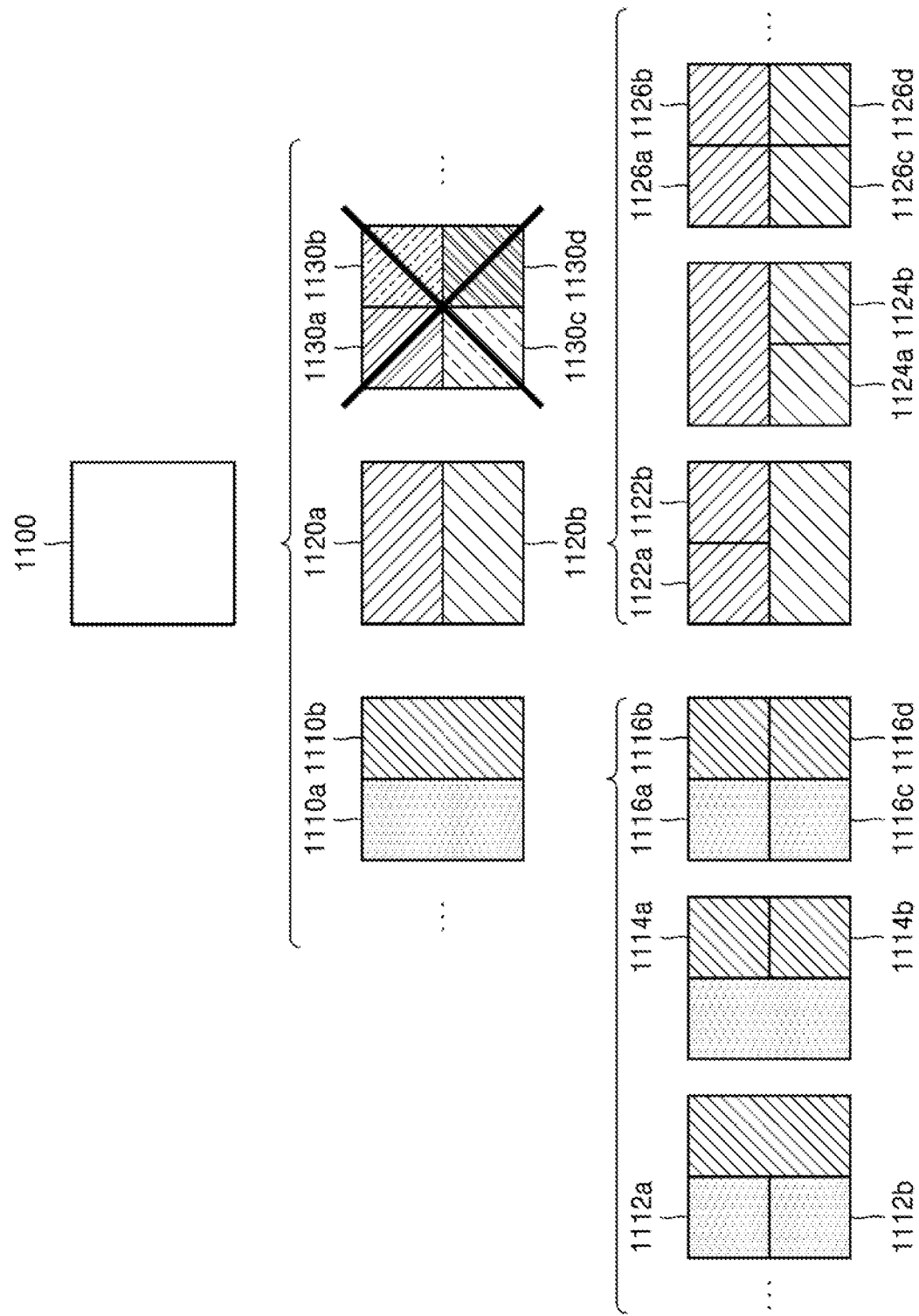
FIG. 11 illustrates a process, performed by an image decoding apparatus, of splitting a square coding unit when split shape mode information is unable to indicate that the square coding unit is split into four square coding units, according to an embodiment.

FIG. 11 illustrates a process, performed by the image decoding apparatus, of splitting a square coding unit when split shape mode information is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on split shape mode information. The split shape mode information may include information about various shapes in which a coding unit is splittable but, the information about various shapes may not include information for splitting the coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a predefined order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
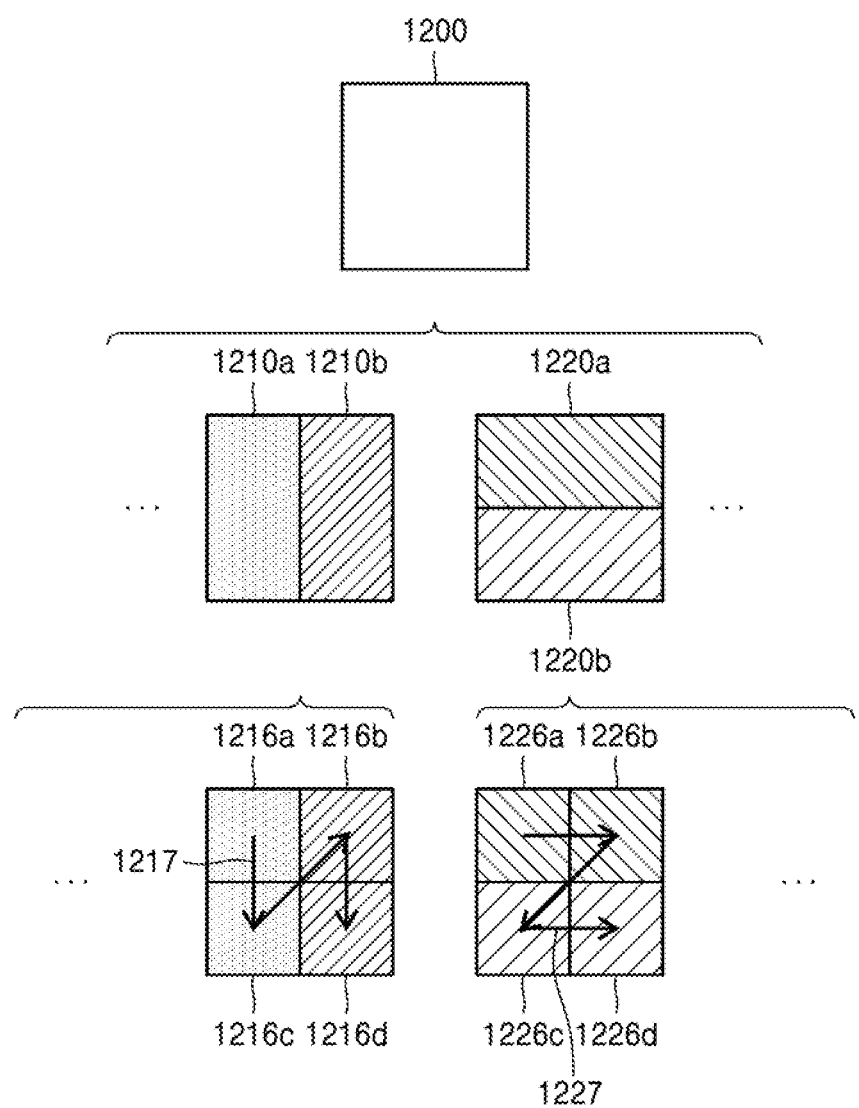
FIG. 12 illustrates that a processing order between a plurality of coding units may be changed depending on a process of splitting a coding unit, according to an embodiment.

FIG. 12 illustrates that a processing order of a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a and 1210b or 1220a and 1220b has been described above in relation to FIG. 11, and thus detailed descriptions thereof will not be provided herein.

According to an embodiment, the image decoding apparatus 100 may process coding units in a predefined order. An operation of processing coding units in a predefined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually illustrates same-shaped coding units split from the first coding unit 1200. Accordingly, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predefined criterion. For example, the predefined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
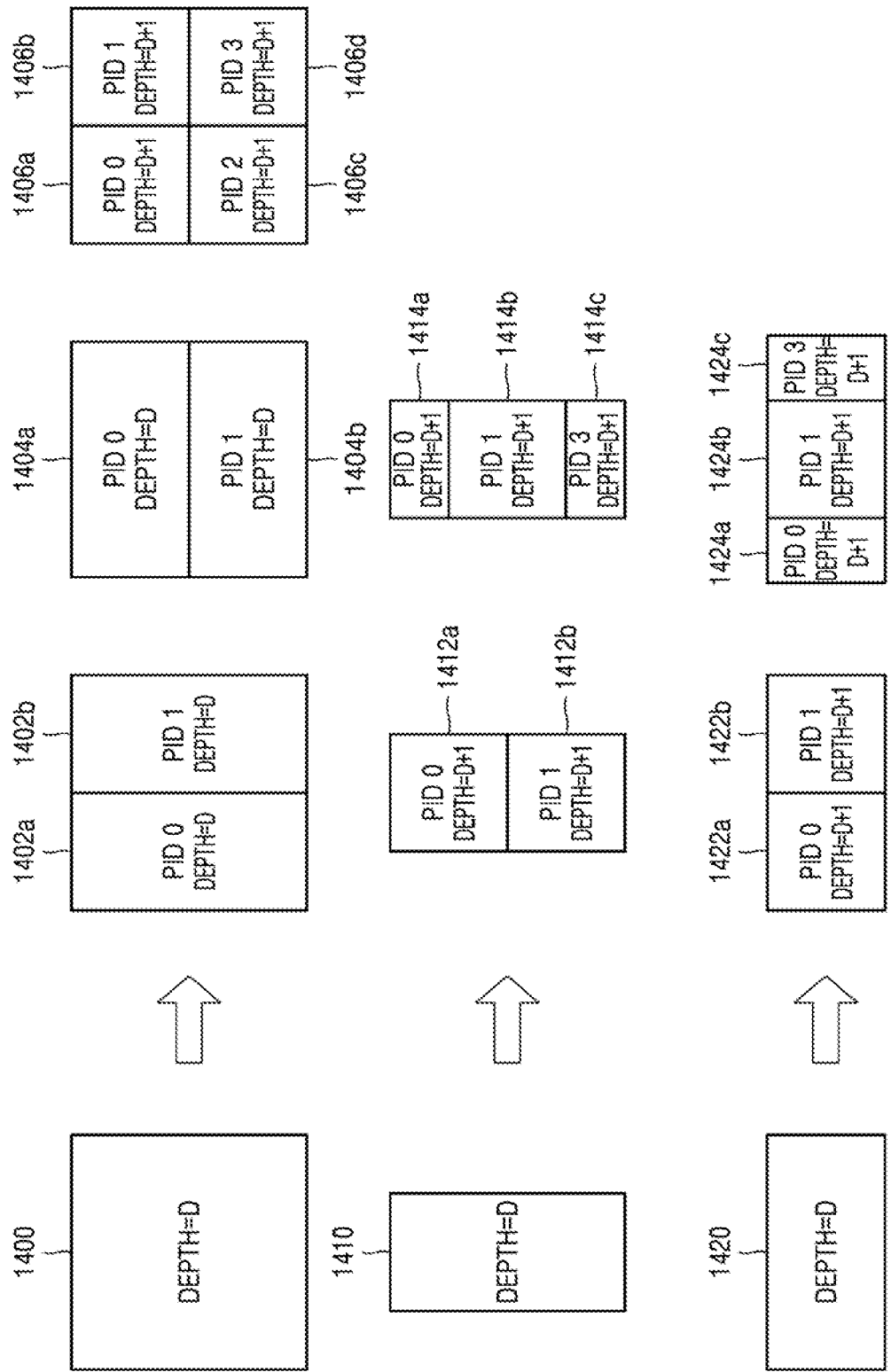
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402*a* and 1402*b*, 1404*a* and 1404*b*, and 1406*a*, 1406*b*, 1406*c*, and 1406*d* by splitting the first coding unit 1400 in at least one of vertical and horizontal directions based on split shape mode information. That is, the image decoding apparatus 100 may determine the second coding units 1402*a* and 1402*b*, 1404*a* and 1404*b*, and 1406*a*, 1406*b*, 1406*c*, and 1406*d*, based on the split shape mode information of the first coding unit 1400.

According to an embodiment, depths of the second coding units 1402*a* and 1402*b*, 1404*a* and 1404*b*, and 1406*a*, 1406*b*, 1406*c*, and 1406*d* that are determined based on the split shape mode information of the square first coding unit 1400, may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 2100 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location from among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample of a predefined location of each coding unit (e.g., an upper left sample).

According to an embodiment, the image decoding apparatus 100 may determine a coding unit at a predefined location from among the split coding units, by using the PIDs for distinguishing between the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units so as to determine a coding unit at a center location from among the coding units. The image decoding apparatus 100 may determine the coding unit 1414b having a PID corresponding to a middle value from among the PIDs of the coding units, as the coding unit at the center location from among the coding units determined by splitting the first coding unit 1410. According to an embodiment, the image decoding apparatus 100 may determine PIDs for distinguishing between split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predefined location from among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predefined location are not limited to the above-described examples, and various PIDs and various locations and sizes of coding units may be used.

According to an embodiment, the image decoding apparatus 100 may use a predefined data unit where a coding unit starts to be recursively split.

Figure 15:
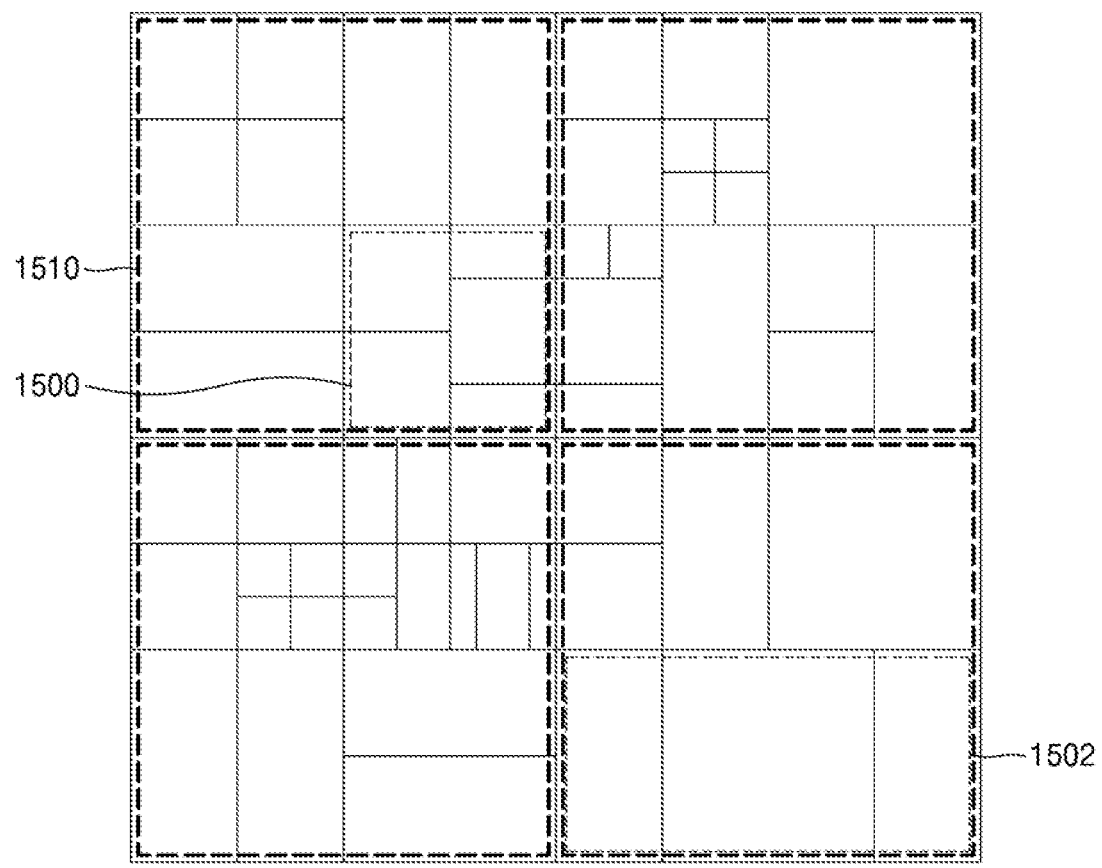
FIG. 15 illustrates that a plurality of coding units are determined based on a plurality of predefined data units included in a picture, according to an embodiment.

FIG. 15 illustrates that a plurality of coding units are determined based on a plurality of predefined data units included in a picture, according to an embodiment.

According to an embodiment, a predefined data unit may be defined as a data unit where a coding unit starts to be recursively split by using split shape mode information. That is, the predefined data unit may correspond to a coding unit of an uppermost depth, which is used to determine a plurality of coding units split from a current picture. In the following descriptions, for convenience of explanation, the predefined data unit is referred to as a reference data unit.

According to an embodiment, the reference data unit may have a predefined size and shape. According to an embodiment, the reference data unit may include M×N samples. Herein, M and N may be equal to each other, and may be integers expressed as powers of 2. That is, the reference data unit may have a square or non-square shape, and may be split into an integer number of coding units at a later time.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above with reference to the operation of splitting the current coding unit 300 of FIG. 3, and an operation of splitting the non-square reference coding unit 1502 into one or more coding units has been described above with reference to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predefined condition. That is, the receiver 110 may obtain, from the bitstream, only the PID for identifying the size and shape of reference coding units with respect to each slice, each slice segment, each tile, each tile group, or largest coding unit which is a data unit satisfying a predefined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the predefined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
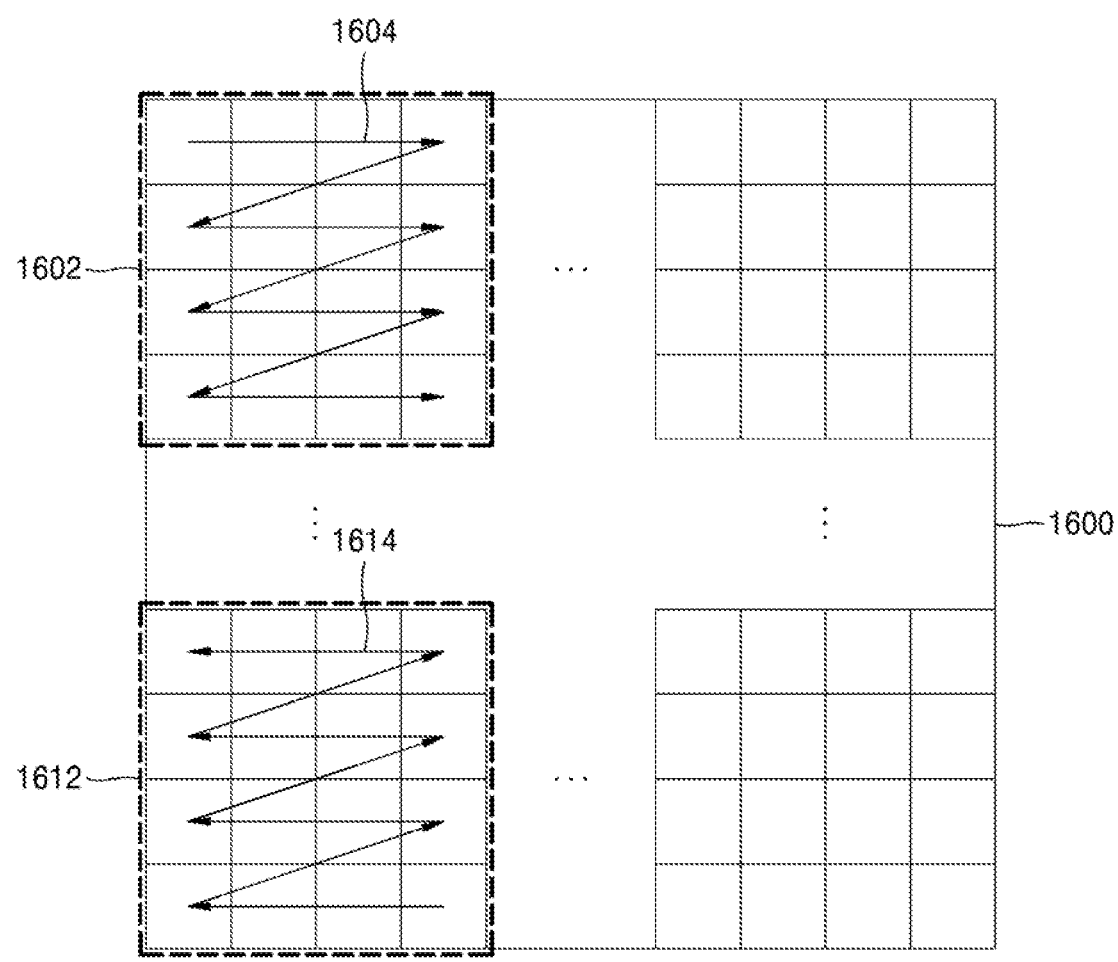
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predefined size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, slice segment, tile, tile group, or the like. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on a determination order determined according to an embodiment.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule according to an embodiment of the disclosure will be described in detail.

The image decoding apparatus 100 may determine a split rule of an image. The split rule may be pre-determined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 2200 and the image decoding apparatus 100 may pre-determine to determine the split rule based on the block shape of the coding unit. However, an embodiment is not limited thereto. The image decoding apparatus 100 may determine the split rule based on the information obtained from the bitstream received from the image encoding apparatus 2200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32 or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 2200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders.

Because the decoding processing orders have been described above with reference to FIG. 12, details thereof are not provided again.

Hereinafter, a method and apparatus for signaling motion vector resolution information with a high-level syntax which is a group of information that is applied to a predefined data unit group to encode or decode video in applying Adaptive Motion Vector Resolution (AMVR) according to an embodiment disclosed in the present specification will be described with reference to FIGS. 17 to 20.

Figure 17:
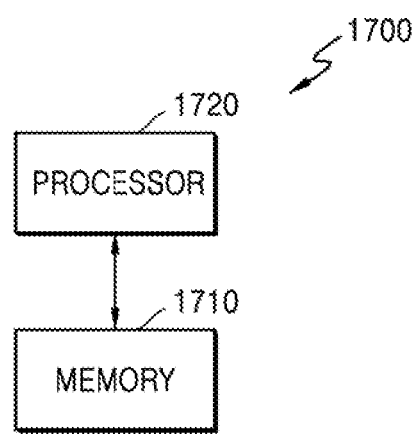
FIG. 17 is a block diagram of a video encoding apparatus according to an embodiment.

FIG. 17 is a block diagram of a video encoding apparatus according to an embodiment.

In video encoding, inter predication means a prediction method using similarity between a current image and another image. A reference block that is similar to a current block of the current image may be detected from a reference image processed before the current image, and a difference in coordinates between the current block and the reference block may be represented as a motion vector. Also, differences between pixel values of the current block and pixel values of the reference block may be represented as residual data. Accordingly, through inter prediction for the current block, by outputting an index indicating a reference image, a motion vector, and residual data, instead of directly outputting image information of the current block, encoding and decoding efficiency may be improved.

A video encoding apparatus 1700 according to an embodiment may include a memory 1710 and at least one processor 1720 connected to the memory 1710. Operations of the video encoding apparatus 1700 according to an embodiment may operate as individual processors or by a control of a central processor. Also, the memory 1710 of the video encoding apparatus 1700 may store data received from outside and data (for example, motion vector resolution information, etc.) generated by the processor 1720.

The processor 1720 of the video encoding apparatus 1700 may perform motion prediction on a current block to determine a motion vector and a motion vector resolution of the current block, determine a motion vector of a candidate block of at least one candidate block as a prediction motion vector of the current block based on the motion vector resolution of the current block, determine a residual motion vector of the current block using the prediction motion vector of the current block, encode motion vector resolution information about the motion vector resolution of the current block with a high-level syntax which is a group of information that is applied to a predefined data unit group including the current block, and encode the residual motion vector of the current block.

Hereinafter, detailed operations about a video encoding method of generating motion vector resolution information with a high-level syntax when applying an adaptive motion vector resolution in the video encoding apparatus 1700 according to an embodiment will be described with reference to FIG. 18.

Figure 18:
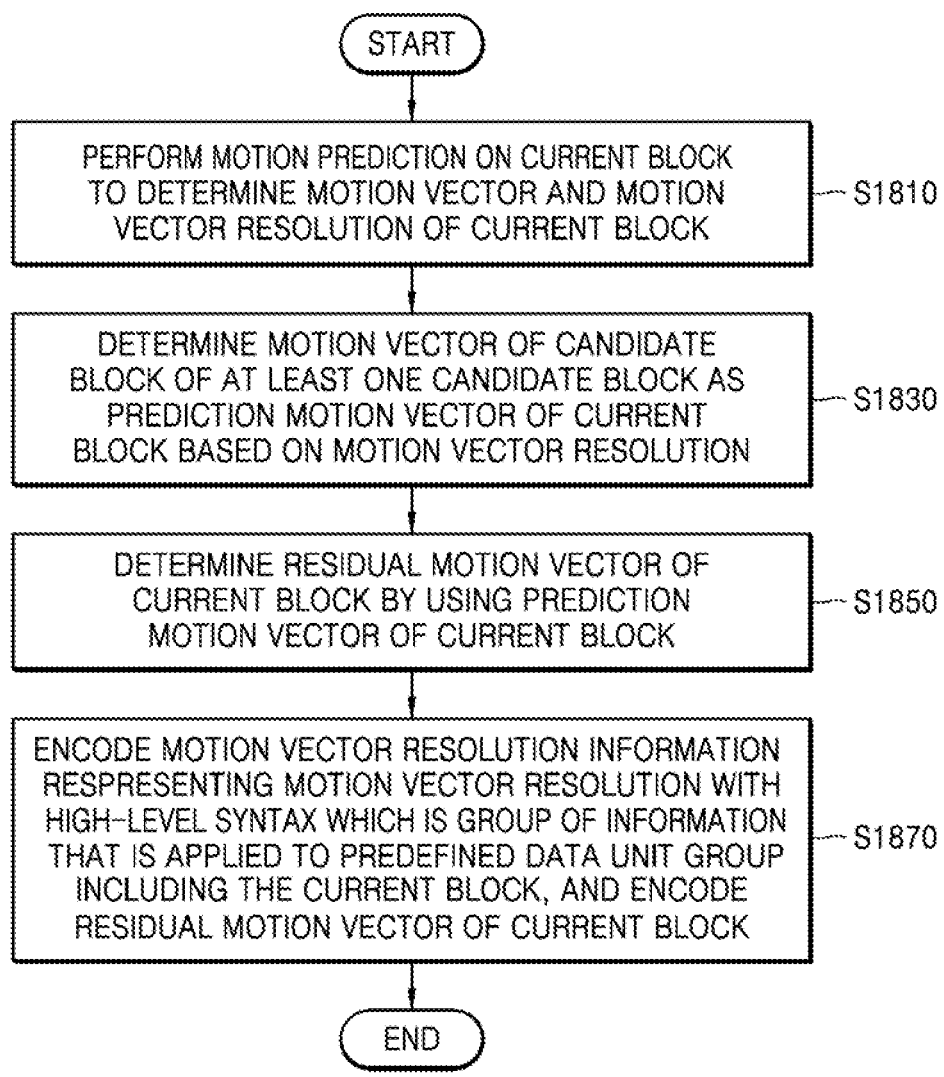
FIG. 18 is a flowchart of a video encoding method according to an embodiment.

FIG. 18 is a flowchart of a video encoding method according to an embodiment.

Referring to FIG. 18, in operation S1810, the video encoding apparatus 1700 may perform motion prediction on a current block to determine a motion vector and a motion vector resolution of the current block.

More specifically, the motion vector resolution of the current block may be determined to have optimal cost by calculating rate-distortion cost based on motion prediction.

In operation S1830, the video encoding apparatus 1700 may determine a motion vector of a candidate block of at least one candidate block as a prediction motion vector of the current block based on the motion vector resolution of the current block.

The motion vector resolution (hereinafter, also referred to as MVR) may include at least one of a MVR of a ⅛ pel unit, a MVR of a ¼ pel unit, a MVR of a ½ pel unit, a MVR of a 1 pel unit, a MVR of a 2 pel unit, a MVR of a 4 pel unit, and a MVR of a 8 pel unit. However, the MVR is not limited to the above-mentioned MVRs, and there may be MVRs of pel units having various values.

In the present specification, that a first MVR is greater than a second MVR means that a pel unit of the first MVR is larger than a pel unit of the second MVR. For example, the MVR of the 1 pel unit may be greater than the MVR of the ½ pel unit, and the MVR of the ½ pel unit may be greater than the MVR of the ¼ pel unit. Actually, in a case of determining a motion vector with the MVR of the ¼ pel unit, more precise prediction is possible than a case of determining a motion vector with the MVR of the 1 pel unit. However, in the present specification, for convenience of description, differences in magnitude between the MVRs will be described based on pel unit sizes of the MVRs.

The at least one candidate block may be selected from among blocks including a spatial block and a temporal block related to the current block. The spatial block related to the current block may include at least one block being spatially adjacent to the current block. The temporal block may include a block positioned at the same location as the current block in a reference image having a Picture Order Count (POC) that is different from a POC of the current block, and at least one block being spatially adjacent to the block positioned at the same location.

In operation S1850, the video encoding apparatus 1700 may determine a residual motion vector of the current block by using the prediction motion vector of the current block.

In operation S1870, the video encoding apparatus 1700 may encode motion vector resolution information about the motion vector resolution of the current block with a high-level syntax which is a group of information that is applied to a predefined data unit group including the current block, and encode the residual motion vector of the current block.

In the present specification, the "motion vector resolution information" means various information related to the motion vector resolution. For example, the motion vector resolution information may indicate a motion vector resolution index determined by the high-level syntax and corresponding to the motion vector resolution, information about a maximum number of motion vector resolution indices, information about a minimum number of motion vector resolution indices, etc., although not limited thereto.

In the present specification, the "high-level syntax" means a syntax existing in a bit stream hierarchically located on a macro block layer. For example, a high-level syntax may indicate a syntax existing in a Sequence Parameter Set (SPS) level, a Picture Parameter Set (PPS) level, a slice header level, or a tile header, although not limited thereto.

According to an embodiment, the processor 1720 may be configured to signal a syntax element representing motion vector resolution information in a sequence parameter set (SPS). A video sequence may include a series of video frames or pictures, and a sequence parameter set may include syntax elements transmitted in a sequence unit.

According to an embodiment, the processor 1720 may be configured to signal a syntax element representing motion vector resolution information in a picture parameter set (PPS). The picture parameter set (PPS) may be a set of parameters representing several sheets of syntaxes in a picture level.

According to an embodiment, the processor 1720 may be configured to signal a syntax element representing motion vector resolution information in a slice header. A picture may be split into several slices. A slice header may represent a syntax in a slice unit.

According to an embodiment, the processor 1720 may be configured to signal a syntax element representing motion vector resolution information in a tile header. A picture may be split into several tiles. A tile header may represent a syntax in a tile unit.

According to an embodiment, the motion vector resolution information may be encoded by variable length coding (VLC) or truncated unary coding.

According to an embodiment, by transmitting motion vector resolution information in a high-level syntax, a bit rate may be saved so that encoding efficiency and performance may be improved.

Figure 19:
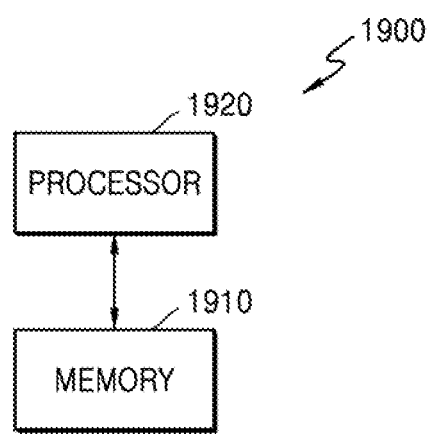
FIG. 19 is a block diagram of a video decoding apparatus according to an embodiment.
Figure 20:
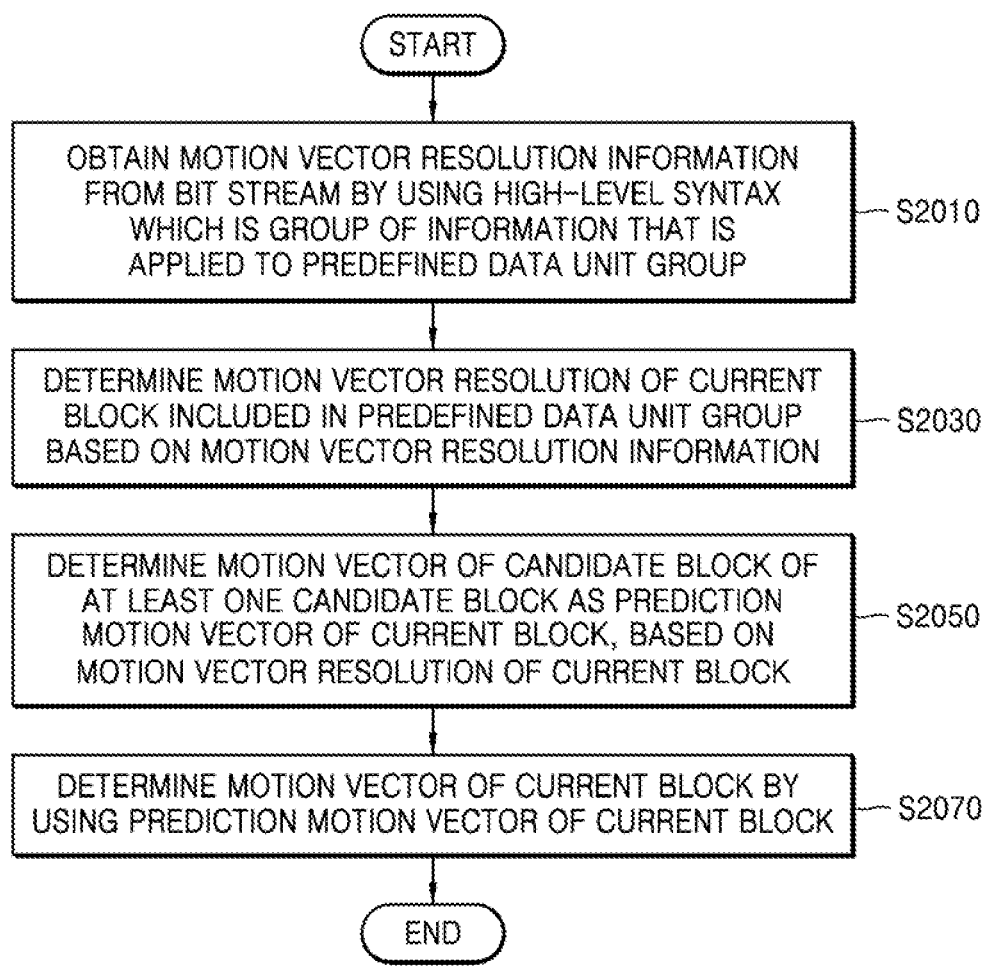
FIG. 20 is a flowchart of a video decoding method according to an embodiment.
Figure 22A:
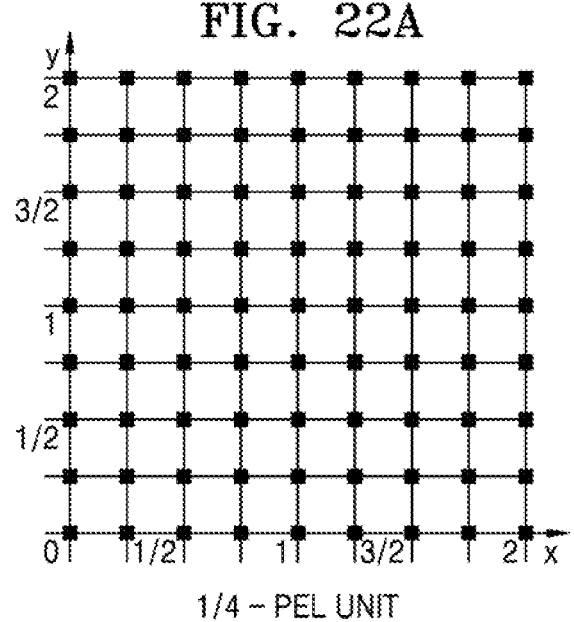
FIG. 22A, FIG. 22B, FIG. 22C, and FIG. 22D illustrate locations of pixels that may be indicated by motion vectors in correspondence to a ¼ pel unit Motion Vector Resolution (MVR), a ½ pel unit MVR, a 1 pel unit MVR, and a 2 pel unit MVR, when a supportable minimum MVR is a ¼ pel unit MVR.
Figure 22B:
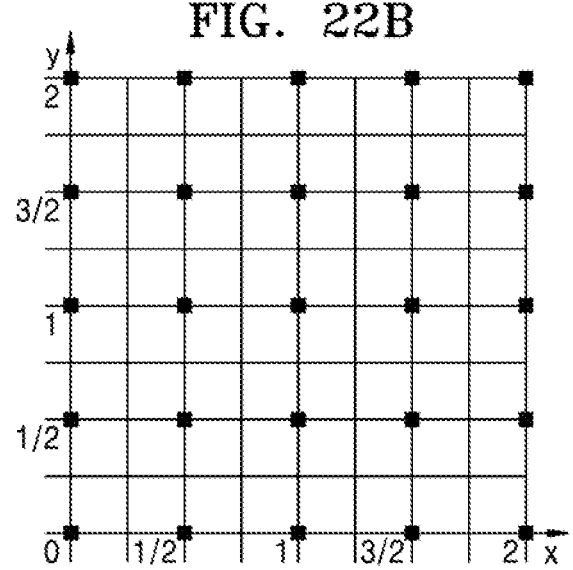
Figure 22C:
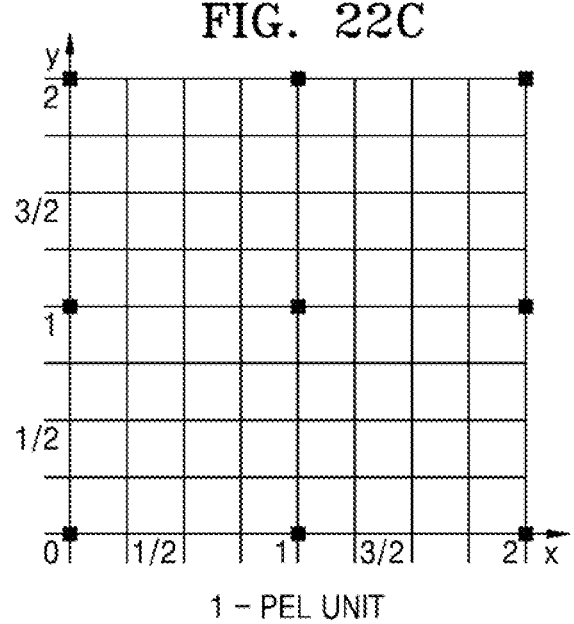
Figure 22D:
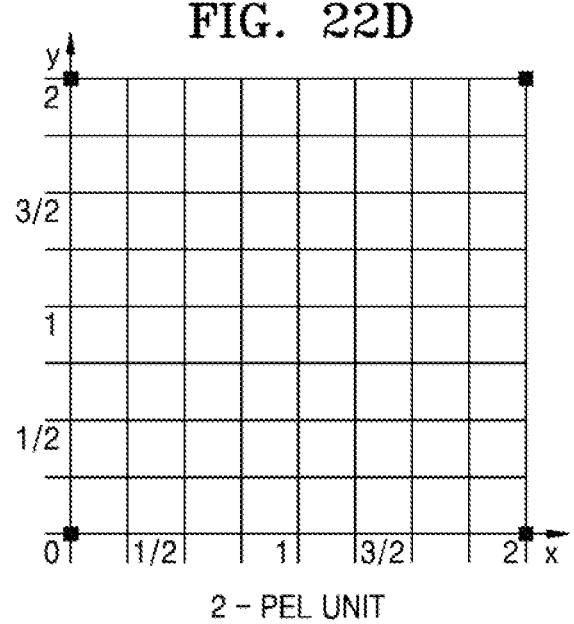

FIGS. 19 and 20 are a block diagram of a video decoding apparatus according to an embodiment and a flowchart of a video decoding method according to an embodiment, respectively corresponding to the video encoding apparatus and the video encoding method as described above.

FIG. 19 is a block diagram of a video decoding apparatus according to an embodiment.

A video decoding apparatus 1900 according to an embodiment may include a memory 1910 and at least one processor 1920 connected to the memory 1910. Operations of the video decoding apparatus 1900 according to an embodiment may operate as individual processors or by a control of a central processor. Also, the memory 1910 of the video decoding apparatus 1900 may store data received from outside and data (for example, motion vector resolution information, etc.) generated by the processor 1920.

The processor 1920 of the video decoding apparatus 1900 may obtain motion vector resolution information from a bit stream by using a high-level syntax which is a group of information that is applied to a predefined data unit group, determine a motion vector resolution of a current block included in the predefined data unit group based on the motion vector resolution information, determine a motion vector of a candidate block of at least one candidate block based on the motion vector resolution of the current block, and determine a motion vector of the current block by using the motion vector of the candidate block as a prediction motion vector of the current block.

Hereinafter, detailed operations of a video decoding method of using motion vector resolution information in a high-level syntax when applying an adaptive motion vector resolution in the video decoding apparatus 1900 according to an embodiment will be described with reference to FIG. 20.

FIG. 20 is a flowchart of a video decoding method according to an embodiment.

Referring to FIG. 20, in operation S2010, the video decoding apparatus 1900 may obtain motion vector resolution information from a bit stream by using a high-level syntax which is a group of information that is applied to a predefined data unit group. More specifically, the high-level syntax may be one of a sequence level syntax, a picture level syntax, a slice level syntax, and a tile level syntax.

According to an embodiment, the processor 1920 may be configured to obtain a syntax element representing motion vector resolution information signaled in a sequence parameter set SPS.

According to an embodiment, the processor 1720 may be configured to obtain a syntax element representing motion vector resolution information signaled in a picture parameter set (PPS).

According to an embodiment, the processor 1720 may be configured to obtain a syntax element representing motion vector resolution information signaled in a slice header.

According to an embodiment, the processor 1720 may be configured to obtain a syntax element representing motion vector resolution information signaled in a tile header.

According to an embodiment, the motion vector resolution information may be encoded by VLC or truncated unary coding and signaled.

According to an embodiment, by obtaining motion vector resolution information by using a high-level syntax, a bit rate may be saved so that encoding efficiency and performance may be improved.

In operation S2030, a motion vector resolution of a current block included in the predefined data unit group may be determined based on the motion vector resolution information.

More specifically, the motion vector resolution of the current block included in the predefined data unit group may be determined based on at least one of motion vector resolution information which is a group of various information related to the motion vector resolution, for example, a motion vector resolution index determined by a high-level syntax and corresponding to a motion vector resolution, information about a maximum number of motion vector resolution indices, information about a minimum number of motion vector resolution indices, etc.

In operation S2050, a motion vector of at least one candidate block may be determined based on the motion vector resolution of the current block. More specifically, the video decoding apparatus 1900 may determine a candidate block that is used to determine a prediction motion vector of the current block.

In operation S2070, a motion vector of the current block may be determined by using the motion vector of the candidate block as a prediction motion vector of the current block.

According to an embodiment, a motion vector of a candidate block having a candidate motion vector resolution corresponding to a MVR of the current block may be used as the prediction motion vector of the current block, and a residual motion vector of the current block may be added to the prediction motion vector of the current block to determine a motion vector of the current block.

According to an embodiment, when the candidate motion vector resolution of the candidate block is different from the motion vector resolution of the current block, the motion vector of the candidate block may be adjusted to determine a prediction motion vector of the current block. A method of adjusting the motion vector of the candidate block will be described with reference to FIGS. 26A and 26B, later.

According to an embodiment, the motion vector resolution information may change according to information about at least one of the current block, a previously decoded block, a current tile, a previously decoded tile, a current slice, a previously decoded slice, a current picture, and a previously decoded picture.

Figure 21:
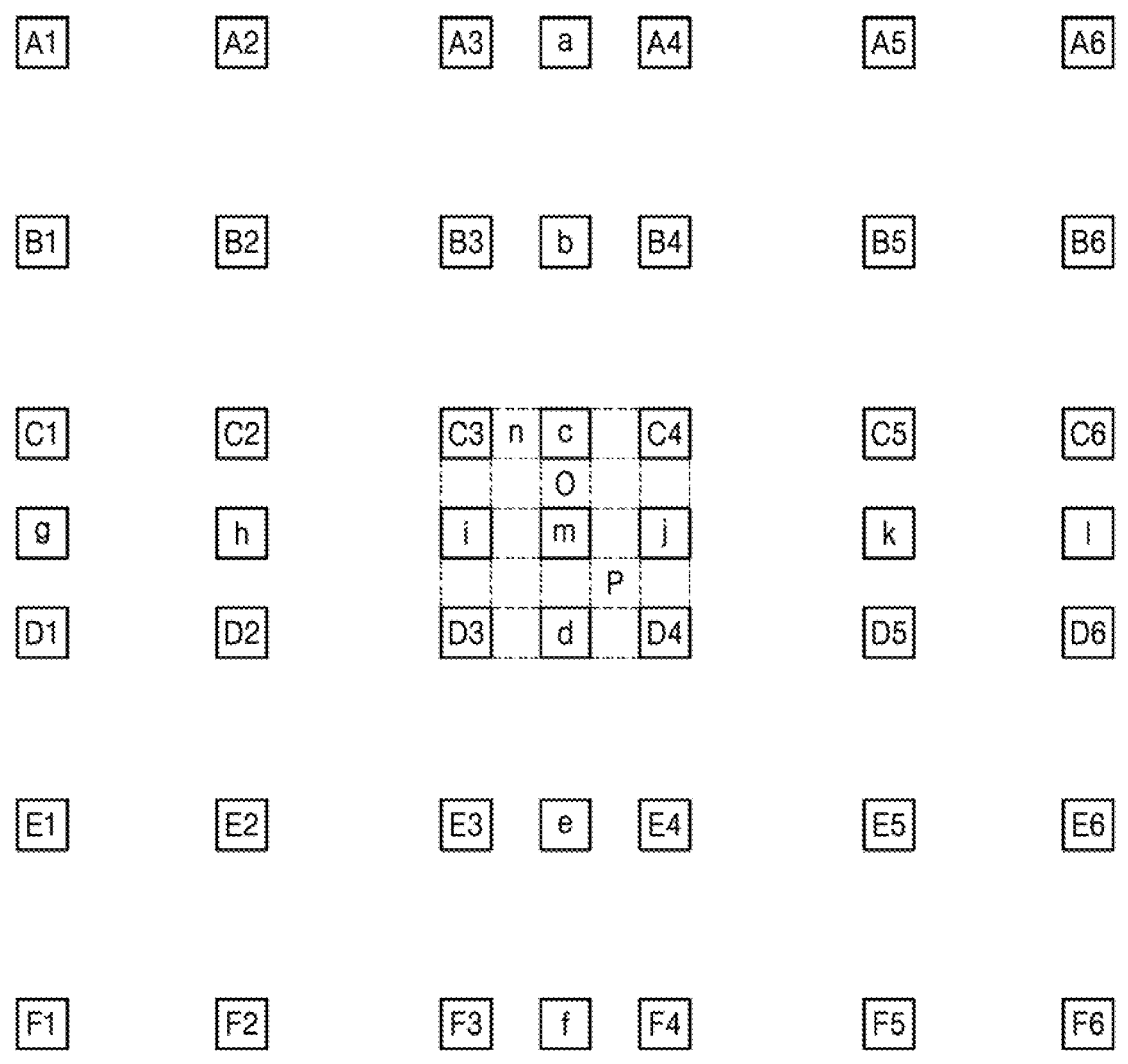

FIG. 21 is a view for describing an interpolation method for determining motion vectors according to various motion vector resolutions.

The video encoding apparatus 1700 may determine a motion vector of a current block according to at least one candidate MVR to perform inter prediction on the current block. A supportable candidate MVR may include a MVR of a $2^k$ pel unit (k is an integer). When k is greater than 0, the motion vector may indicate only integer pixels in an interpolated reference image, and when k is smaller than 0, the motion vector may indicate sub pixels and integer pixels.

For example, when a minimum MVR has a ¼ pel unit, the video encoding apparatus 1700 may interpolate a reference image to generate sub pixels of the ¼ pel unit, and determine a motion vector indicating a pixel corresponding to a candidate MVR, for example, a MVR of a ¼ pel unit, a MVR of a ½ pel unit, a MVR of a 1 pel unit, or a MVR of a 2 pel unit.

For example, the video encoding apparatus 1700 may perform interpolation on the reference image by using a n-tap Finite Impulse Response (FIR) filter to generate sub pixels a to I of the ½ pel unit. In regard of ½ sub pixels located in a vertical direction, interpolation may be performed using A1, A2, A3, A4, A5, and A6 of an integer pel unit to generate a sub pixel a, and interpolation may be performed using B1, B2, B3, B4, B5, and B6 of an integer pel unit to generate a sub pixel b. Sub pixels c, d, e, and f may also be generated by the same method.

Pixel values of the ½ sub pixels located in the vertical direction may be calculated as follows. For example, a=(A1−5×A2+20×A3+20×A4−5×A5+A6)/32 and b=(B1−5×B2+20×B3+20×B4−5×B5+B6)/32. Pixel values of the sub pixels c, d, e, and f may also be calculated by the same method.

The video encoding apparatus 1700 may perform interpolation on sub pixels located in a horizontal direction, as well as the sub pixels located in the vertical direction, by using a 6-tap FIR filter. A sub pixel g may be generated by using A1, B1, C1, D1, E1, and F1, and a sub pixel h may be generated by using A2, B2, C2, D2, E2, and F2.

Pixel values of the sub pixels located in the horizontal direction may also be calculated by the same method applied to calculate the pixel values of the sub pixels located in the vertical direction. For example, g=(A1−5×B1+20×C1+20×D1−5×E1+F1)/32.

A sub pixel m of the ½ pel unit located in a diagonal direction may be interpolated by using another sub pixel of the ½ pel unit. In other words, a pixel value of the sub pixel m may be calculated as m=(a−5×b+20×c+20×d−5×e+f)/32.

After the sub pixels of the ½ pel unit are generated, the video encoding apparatus 1700 may generate sub pixels of the ¼ pel unit by using integer pixels and the sub pixels of the ½ pel unit. The video encoding apparatus 1700 may perform interpolation by using two adjacent pixels to generate sub pixels of the ¼ pel unit. Alternatively, the video encoding apparatus 1700 may generate sub pixels of the ¼ pel unit by applying an interpolation filter directly on pixel values of the integer pixels, without using the pixel values of the sub pixels of the ½ pel unit.

The interpolation filter has been described as an example of a 6-tap filter, however, the video encoding apparatus 1700 may interpolate a picture by using a filter having another number of taps. For example, the interpolation filter may be a 4-tap filter, a 7-tap filter, an 8-tap filter, or a 12-tap filter.

FIG. 22A, FIG. 22B, FIG. 22C, and FIG. 22D illustrate locations of pixels that may be indicated by motion vectors in correspondence to a ¼ pel unit MVR, a ½ pel unit MVR, a 1 pel unit MVR, and a 2 pel unit MVR, when a supportable minimum MVR is a ¼ pel unit MVR.

FIG. 22A, FIG. 22B, FIG. 22C, and FIG. 22D show coordinates (represented as black squares) of pixels that may be indicated by motion vectors of a ¼ pel unit MVR, a ½ pel unit MVR, a 1 pel unit MVR, and a 2 pel unit MVR with respect to coordinates (0, 0).

When a minimum MVR is the ¼ pel unit MVR, coordinates of a pixel that may be indicated by a motion vector of the ¼ pel unit MVR may be (a/4, b/4) (a and b are integers), coordinates of a pixel that may be indicated by a motion vector of the ½ pel unit MVR may be (2c/4, 2d/4) (c and d are integers), coordinates of a pixel that may be indicated by a motion vector of the 1 pel unit MVR may be (4e/4, 4f/4) (e and f are integers), and coordinates of a pixel that may be indicated by a motion vector of the 2 pel unit MVR may be (8g/4, 8h/4) (g and h are integers). That is, when the minimum MVR has a $2^m$ (m is an integer) pel unit, coordinates of a pixel that may be indicated by a $2^n$ (n is an integer) pel unit MVR may be ($2^{n-m}$*i/$2^{-m}$, $2^{n-m}$*j/$2^{-m}$) (i and j are integers). Although a motion vector is determined according to a specific MVR, the motion vector may be represented as coordinates in an image interpolated according to the ¼ pel unit.

According to an embodiment, because the video encoding apparatus 1700 determines a motion vector in an image interpolated according to a minimum MVR, the video encoding apparatus 1700 may multiply the motion vector (and a prediction motion vector) by an inverse number (for example, $2^{-m}$ when the minimum MVR has a $2^m$ (m is an integer) pel unit) of a pel unit value of the minimum MVR to represent a motion vector of an integer unit, such that the motion vector (and the prediction motion vector) can be represented as an integer. The motion vector of the integer unit multiplied by $2^{-m}$ may be used in the video encoding apparatus 1700 and the video decoding apparatus 1900.

When a motion vector of a ½ pel unit MVR starting from coordinates (0, 0) indicates coordinates (2/4, 6/4) (a motion vector of the ½ pel unit is a value (1, 3) resulting from multiplying the coordinates by an integer 2) and a minimum MVR has the ¼ pel unit, the video encoding apparatus 1700 may determine, as a motion vector, a value (2, 6) resulting from multiplying the coordinates (2/4, 6/4) indicated by the motion vector by an integer 4.

When a magnitude of a MVR is smaller than the 1 pel unit, the video encoding apparatus 1700 according to an embodiment may search for a block that is similar to a current block in a reference image based on a sub pel unit, with respect to a motion vector determined in an integer pel unit, in order to perform motion prediction in the sub pel unit.

For example, when a MVR of a current block is a ¼ pel unit MVR, the video encoding apparatus 1700 may determine a motion vector in an integer pel unit, interpolate a reference image to generate sub pixels in a ½ pel unit, and then search for a prediction block that is most similar to the current block in a range of (−1 to 1, −1 to 1) with respect to a motion vector determined in an integer pel unit. Then, the video encoding apparatus 1700 may interpolate the reference image to generate sub pixels of the ¼ pel unit, and then search for a prediction block that is most similar to the current block in the range of (−1 to 1, −1 to 1) with respect to the motion vector determined in the ½ pel unit, thereby determining a final motion vector of the ¼ pel unit MVR.

For example, when a motion vector of an integer pel unit is (−4, −3) with respect to coordinates (0, 0), the motion vector may become (−8, −6) (=(−4*2, −3*2) in the ½ pel unit MVR, and, when the motion vector moves by (0, −1), the motion vector of the ½ pel unit MVR may be finally determined as (−8, −7) (=(−8, −6-1)). Also, in the ¼ pel unit MVR, the motion vector may change to (−16, −14) (=(−8*2, −7*2)), and when the motion vector again moves by (−1, 0), the final motion vector of the ¼ pel unit MVR may be determined as (−17, −14) (=(−16−1, −14)).

When a MVR of a current block is greater than a 1 pel unit MVR, the video encoding apparatus 1700 according to an embodiment may search for a block that is similar to the current block within a reference image based on a pel unit that is greater than the 1 pel unit with respect to a motion vector determined in an integer pel unit, in order to perform motion prediction in the greater pel unit. A pixel located in a pel unit (for example, a 2 pel unit, 3 pel unit, or a 4 pel unit) that is greater than the 1 pel unit may be referenced as a super pixel.

Hereinafter, a method of determining a motion vector resolution index representing a motion vector resolution as described above will be described.

Figure 23:
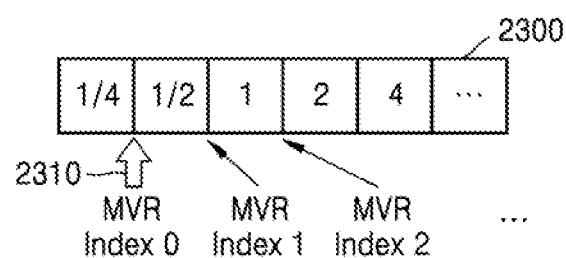
FIG. 23 illustrates an example of determining a motion vector resolution index using a high-level syntax.

FIG. 23 illustrates an example of determining a motion vector resolution index using a high-level syntax.

Referring to FIG. 23, motion vector resolution information may include start resolution location information. The start resolution location information may be information for determining a location of a motion vector resolution index 0 from a predefined motion vector set including a plurality of resolutions arranged in descending order or ascending order. After the motion vector resolution index 0 is determined according to the start resolution location information, motion vector resolution indices 1, 2, etc. may be sequentially determined. Accordingly, at least one motion vector resolution index may be determined from the predefined motion vector set including the plurality of resolutions sequentially arranged, based on the start resolution location information, and a motion vector resolution of a current block may be determined based on the at least one motion vector resolution index. More specifically, FIG. 23 illustrates a predefined motion vector resolution set 2300 arranged in order of ¼, ½, 1, 2, 4, . . . , and start resolution location information may be information representing a location indicated by a thick arrow 2310. A resolution corresponding to a MVR index 0 may be determined as the ¼ pel unit which is a resolution of the location indicated by the thick arrow 2310, based on the start resolution location information. Sequentially, a resolution corresponding to a MVR index 1 may be determined as the ½ pel unit, and a resolution corresponding to a MVR index 2 may be determined as the 1 pel unit.

Figure 24:
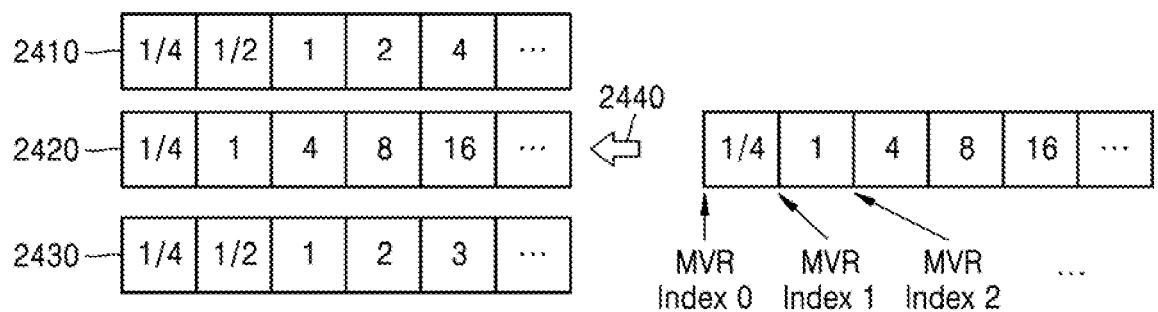
FIG. 24 illustrates another example of determining a motion vector resolution index in a high-level syntax.

FIG. 24 illustrates another example of determining a motion vector resolution index in a high-level syntax.

Referring to FIG. 24, motion vector resolution information may include motion vector resolution set information. The motion vector resolution set information may be information about a motion vector resolution set to be used among a plurality of predefined motion vector resolution sets. Accordingly, a motion vector resolution set from among the plurality of motion vector resolution sets may be determined based on the motion vector resolution set information. A motion vector resolution of a current block may be determined based on at least one motion vector resolution index determined based on the determined motion vector resolution set. A first resolution of resolutions sequentially arranged in descending order or ascending order in the selected motion vector resolution set may become a motion vector resolution index 0, and the next resolution may become a motion vector resolution index 1. More specifically, in a left part of FIG. 24, three motion vector resolution sets 2410, 2420, and 2430 are shown, and motion vector resolution set information may represent a motion vector resolution set used among a plurality of motion vector resolution sets. In FIG. 24, a motion vector resolution set 2420 indicated by a thick arrow 2440 may represent a motion vector resolution set to be used for a current block. As shown in a right part of FIG. 24, the motion vector resolution set 2420 may be determined as a motion vector resolution set. After the motion vector resolution set to be used for the current block is determined based on the motion vector resolution set information, motion vector resolution indices may be sequentially determined from the motion vector resolution set. That is, as shown in FIG. 24, a MVR index 0 may be determined as the ¼ pel unit, a MVR index 1 may be determined as the 1 pel unit, and a MVR index 2 may be determined as the 4 pel unit. When another motion vector resolution set 2410 is selected, a MVR index 0 may be determined as the ¼ pel unit, a MVR index 1 may be determined as the ½ pel unit, and a MVR index 2 may be determined as the 1 pel unit.

According to another embodiment, the motion vector resolution information may include both information about a motion vector resolution set to be used among a plurality of motion vector resolution sets and start resolution information representing a location of a start resolution in the motion vector resolution set. More specifically, when a start resolution location represents a second location by additional information representing a location in the selected motion vector resolution set 2420 in FIG. 24, a resolution corresponding to a MVR index 0 may be a 1 pel unit, a resolution corresponding to a MVR index 1 may be the 4 pel unit, and a resolution corresponding to a MVR index 2 may be the 8 pel unit.

According to another embodiment, the motion vector resolution information may include at least one motion vector resolution index corresponding to at least one motion vector resolution, and a motion vector resolution of a current block may be determined based on the at least one motion vector resolution index. That is, a motion vector resolution index corresponding to each motion vector resolution may be obtained without using any motion vector resolution set.

According to an embodiment, a motion vector resolution may be determined according to a distance between a current frame POC and a reference frame POC, instead of a motion vector resolution index.

According to an embodiment, when it is determined that a current frame is close to a reference frame based on a predefined threshold value and an absolute value of a difference between a current frame POC including a current block and a reference frame POC, a small MVR may be applied, and when it is determined that the current frame is distant from the reference frame, a great MVR may be applied, thereby determining a motion vector resolution of the current block.

According to an embodiment, information representing whether or not to use an absolute value of a difference between a current frame POS and a reference frame POC may be obtained from a bit stream by using a high-level syntax which is a group of information that is applied to a predefined data unit group. That is, when the absolute value of the difference is used, a motion vector resolution of the current block may be determined based on the absolute value of the difference and the predefined threshold value. More specifically, when the absolute value of the difference between the current frame POC and the reference frame POC is greater than a predefined first threshold value (that is, when the reference frame is relatively distant from the current frame), a great motion vector resolution (for example, 2, 4, or 8) may be applied, and, when the absolute value of the difference between the current frame POC and the reference frame POC is smaller than a predefined second threshold value (that is, when the reference frame is relatively close to the current frame), a small motion vector resolution (for example, ⅛, ¼, or ½) may be applied.

According to an embodiment, predefined resolution information corresponding to the absolute value of the difference between the current frame POC and the reference frame POC may be signaled for each picture, slice or tile level. That is, a predefined resolution may be applied according to the distance between the current frame and the reference frame.

According to an embodiment, the motion vector resolution information may include default setting changing information. When the default setting changing information is 0, a previous default setting may be maintained as it is, and, when the default setting changing information is 1, additional information for changing a default setting may be obtained to update the default setting.

According to an embodiment, the motion vector resolution information may include information about a maximum number of motion vector resolution indices. More specifically, a MVR index may be determined based on information about a maximum number of MVR indices for each picture, slice, or tile. For example, referring to FIG. 23, when information about a maximum number of MVR indices indicates that the maximum number is 4, a MVR index 3 corresponding to the 4 pel unit may be additionally obtained. Referring to FIG. 24, a MVR index 3 corresponding to the 8 pel unit of the motion vector resolution set 2420 may be obtained.

According to an embodiment, the information about the number of the MVR indices may be encoded by VLC or truncated unary coding and signaled.

According to another embodiment, when an encoding apparatus and a decoding apparatus have information about a minimum number of MVR indices, information about a difference value between the number of MVR indices of a current picture, slice, or tile and the minimum number of the MVR indices, instead of the number of MVR indices, may be signaled. More specifically, a case in which a minimum number of MVR indices of an encoding/decoding apparatus is 4 is assumed. In this case, when the number of MVR indices of a current picture, slice, or tile is 4, a difference value 0 (=4-4) may be encoded by VLC or truncated unary coding, and, when the number of the MVR indices of the current picture, slice, or tile is 5, a difference value 1 (5-4) may be encoded by VLC or truncated unary coding. Also, when the number of the MVR indices of the current picture, slice, or tile is 6, a difference value 2 (6-4) may be encoded by VLC or truncated unary coding.

Figure 25:
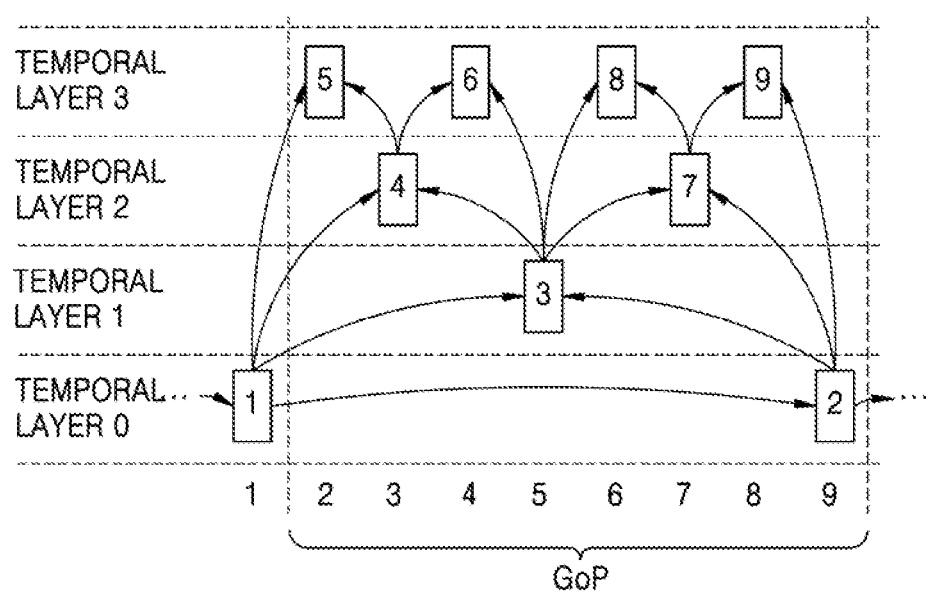
FIG. 25 illustrates a structure of temporal layers for a Group of Pictures (GOP).

FIG. 25 illustrates a structure of temporal layers for a Group of Pictures (GOP).

Referring to FIG. 25, information about a maximum number of MVR indices, information about the number of the MVR indices, information about a minimum number of MVR indices, or difference information may change according to the temporal layers. More specifically, information about a maximum number of MVR indices, information about the number of MVR indices, information about a minimum number of MVR indices, or difference information for each of pictures 1 and 2 corresponding to a temporal layer 0, a picture 3 corresponding to a temporal layer 1, pictures 4 and 7 corresponding to a temporal layer 2, and pictures 5, 6, 8, and 9 corresponding to a temporal layer 3 may be determined as different values according to the temporal layers.

Hereinafter, a prediction motion vector adjusting method that is performed selectively by the video encoding apparatus 1700 and the video decoding apparatus 1900 according to an embodiment will be described with reference to FIGS. 26A and 26B.

When a MVR of a current block is greater than a minimum MVR of selectable candidate MVRs, the video encoding apparatus 1700 and the video decoding apparatus 1900 may adjust a motion vector of a candidate block that is used as a prediction motion vector of the current block.

In order to adjust a prediction motion vector represented as coordinates in an image interpolated according to a minimum MVR with a MVR of a current block, the video encoding apparatus 1700 and the video decoding apparatus 1900 may adjust the prediction motion vector such that the prediction motion vector indicates pixels being adjacent to a pixel indicated by itself.

Figure 26A:
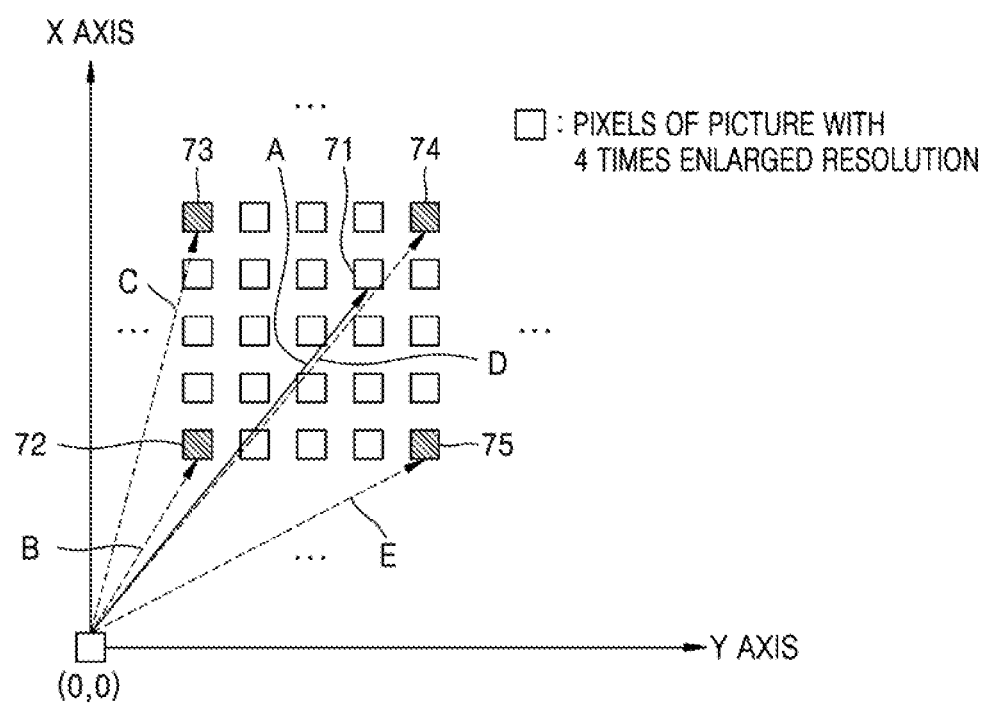
FIGS. 26A and 26B illustrate a method for adjusting a prediction motion vector.

For example, as shown in FIG. 26A, to adjust a prediction motion vector A indicating a pixel 71 of coordinates (19, 20) with respect to coordinates (0, 0) with a 1 pel unit MVR which is a MVR of a current block, the coordinates (19, 27) of the pixel 71 indicated by the prediction motion vector A may be divided by an integer 4 (that is, downscaling). However, there is a case in which coordinates (19/4, 27/4) corresponding to the result of the division do not indicate an integer pel unit.

The video encoding apparatus 1700 and the video decoding apparatus 1900 may adjust the downscaled prediction motion vector such that the downscaled prediction motion vector indicates an integer pel unit. For example, coordinates of integer pixels being adjacent to the coordinates (19/4, 27/4) are (16/4, 28/4), (16/4, 24/4), (20/4, 28/4), and (20/4, 24/4). In this case, the video encoding apparatus 1700 and the video decoding apparatus 1900 may adjust the downscaled prediction motion vector A such that the downscaled prediction motion vector A indicates coordinates (20/4, 28/4) located at a right, upper end, instead of the coordinates (19/4, 27/4), and then multiply the adjusted coordinates (20/4, 28/4) by an integer 4 (that is, upscaling), thereby causing a finally adjusted prediction motion vector D to indicate a pixel 74 corresponding to coordinates (20, 28).

Referring to FIG. 26A, the prediction motion vector A before being adjusted may indicate the pixel 71, and the finally adjusted prediction motion vector D may indicate the pixel 74 in an integer unit located at the right, upper end from the pixel 71.

When the video encoding apparatus 1700 and the video decoding apparatus 1900 according to an embodiment adjust a prediction motion vector according to a MVR of a current block, the video encoding apparatus 1700 and the video decoding apparatus 1900 may cause the adjusted prediction motion vector to indicate a pixel located at a right upper end from a pixel indicated by the predacation motion vector before being adjusted. The video encoding apparatus 1700 and the video decoding apparatus 1900 according to another embodiment may cause an adjusted prediction motion vector to indicate a pixel located at a left, upper end from a pixel indicated by the prediction movement vector before being adjusted, a pixel located at a left, lower end from the pixel, or a pixel located at a right, lower end from the pixel.

According to an embodiment, when any one of a x coordinate value and a y coordinate value indicated by the downscaled prediction motion vector indicates an integer pixel, the video encoding apparatus 1700 and the video decoding apparatus 1900 may increase or decrease only the remaining coordinate value not indicating the integer pixel such that the increased or decreased coordinate value indicates an integer pixel. That is, when a x coordinate value indicated by the downscaled prediction motion vector indicates an integer pixel, the video encoding apparatus 1700 and the video decoding apparatus 1900 may cause the adjusted prediction motion vector to indicate an integer pixel located at an upper end from a pixel indicated by the prediction motion vector before being adjusted or an integer pixel located at a lower end from the pixel. Alternatively, when a y coordinate value indicated by the downscaled prediction motion vector indicates an integer pixel, the video encoding apparatus 1700 and the video decoding apparatus 1900 may cause the adjusted prediction motion vector to indicate an integer pixel located to the left of a pixel indicated by the prediction motion vector before being adjusted or an integer pixel located to the right of the pixel.

When the video encoding apparatus 1700 and the video decoding apparatus 1900 adjust a prediction motion vector, the video encoding apparatus 1700 and the video decoding apparatus 1900 may select a location indicated by the adjusted prediction motion vector according to a MVR of a current block.

Figure 26B:
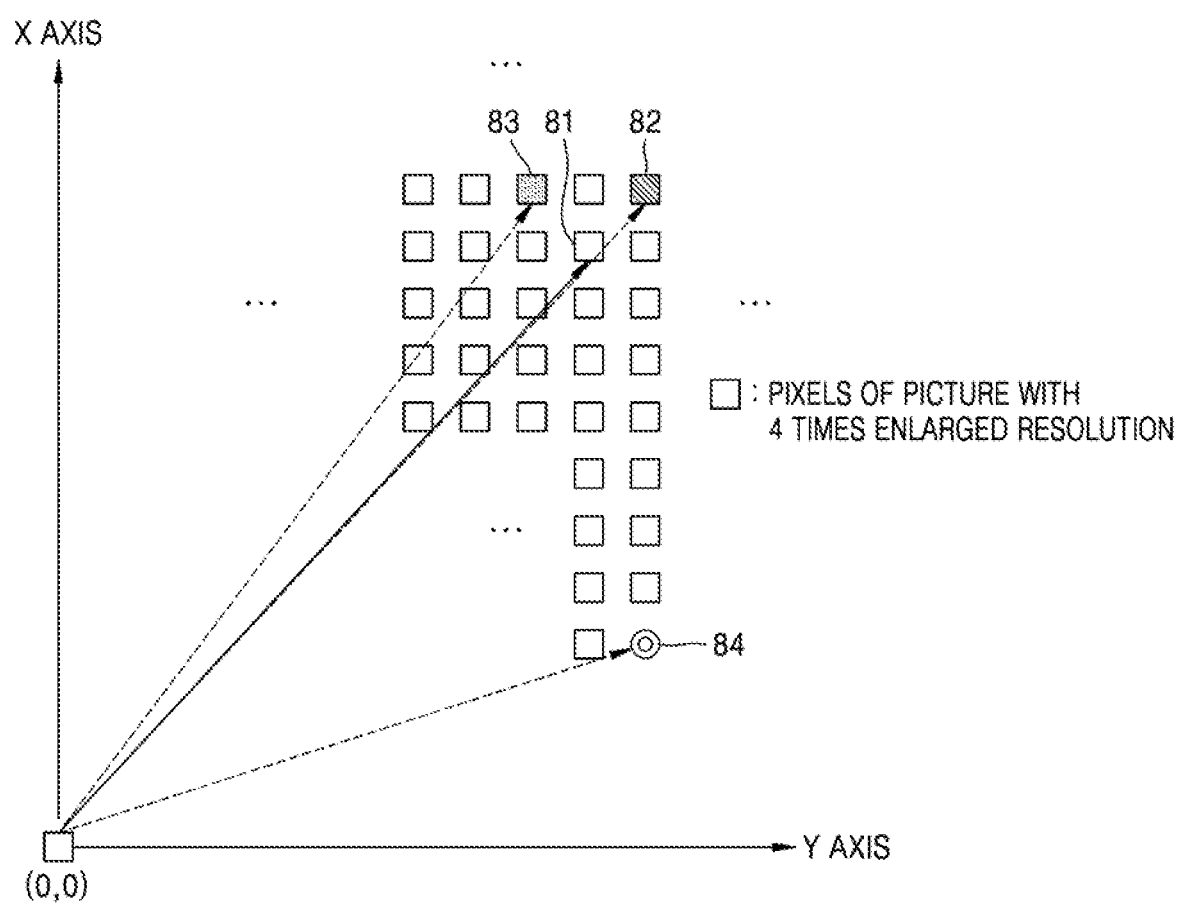

For example, referring to FIG. 26B, the video encoding apparatus 1700 and the video decoding apparatus 1900 may adjust a prediction motion vector such that the adjusted prediction motion vector indicates a pixel located at a left, upper end from a pixel 81 indicated by the prediction motion vector before being adjusted when a MVR of a current block is a ½ pel unit MVR, may adjust the prediction motion vector such that the adjusted prediction motion vector indicates a pixel 82 locate at a right, upper end from the pixel 81 indicated by the prediction motion vector before being adjusted when the MVR of the current block is a 1 pel unit MVR, and may adjust the prediction motion vector such that the adjusted prediction motion vector indicates a pixel 84 located at a right, lower end from the pixel 81 indicated by the prediction motion vector before being adjusted when the MVR of the current block is a 2 pel unit MVR.

The video encoding apparatus 1700 and the video decoding apparatus 1900 may determine a pixel indicated by the adjusted prediction motion vector, based on at least one of the MVR of the current block, a prediction motion vector, information about an adjacent block, encoding information, and an arbitrary pattern.

The video encoding apparatus 1700 and the video decoding apparatus 1900 may adjust a motion vector of a candidate block in consideration of the MVR of the current block and a minimum MVR, according to Equation 1 below.

$$pMV'=((pMV>>k)+\text{offset})<<k \quad \text{[Equation 1]}$$

In Equation 1, pMV' represents the adjusted prediction motion vector, and k is a value determined according to a difference between the minimum MVR and the MVR of the current block. When the MVR of the current block is a $2^m$ pel unit (m is an integer), the minimum MVR is a $2^n$ pel unit (n is an integer), and m>n, k may be m-n.

According to an embodiment, k may be an index of a MVR, and when candidate MVRs include a ¼ pel unit MVR, a ½ pel unit MVR, a 1 pel unit MVR, a 2 pel unit MVR, and a 4 pel unit MVR, a MVR corresponding to each index of the MVRs has been shown above in Table 1. When the video decoding apparatus 1900 receives a MVR index from a bit stream, the video decoding apparatus 1900 may adjust a motion vector of a candidate block according to Equation 1 by using the MVR index as k.

Also, in Equation 1, >> or << represents a bit shift operation of decreasing or increasing a magnitude of a prediction motion vector. Also, offset means a value that is added to or subtracted from pMV downscaled according to the k value when the pMV does not indicate an integer pixel. Offset may be determined as different values for a x coordinate value and a y coordinate value of a basic MV.

According to an embodiment, the video encoding apparatus 1700 and the video decoding apparatus 1900 may change the downscaled pMV according to the same criterion such that the downscaled pMV indicates an integer pixel.

According to an embodiment, when a x coordinate value and a y coordinate value of the downscaled pMV do not indicate an integer pixel, the video encoding apparatus 1700 and the video decoding apparatus 1900 may increase the x coordinate value and the y coordinate value of the downscaled pMV such that the x coordinate value and the y coordinate value of the downscaled pMV indicate an integer value, or decrease the x coordinate value and the y coordinate value of the downscaled pMV such that the x coordinate value and the y coordinate value of the downscaled pMV indicate an integer value. Alternatively, the video encoding apparatus 1700 and the video decoding apparatus 1900 may round off the x coordinate value and the y coordinate value of the downscaled pMV such that the x coordinate value and the y coordinate value of the downscaled pMV indicate an integer value.

According to an embodiment, when the video encoding apparatus 1700 and the video decoding apparatus 1900 adjust a motion vector of a candidate block, the video encoding apparatus 1700 and the video decoding apparatus 1900 may omit downscaling and up-scaling of the motion vector, and adjust the motion vector on a coordinate plane in a reference image interpolated according to a minimum MVR such that the motion vector indicates a pel unit corresponding to a MVR of a current block.

Also, according to an embodiment, when the video encoding apparatus 1700 and the video decoding apparatus 1900 adjust the motion vector of the candidate block in consideration of the MVR of the current block and the minimum MVR, the video encoding apparatus 1700 and the video decoding apparatus 1900 may adjust the motion vector according to Equation 2 below, instead of Equation 1.

$$pMV'=((pMV+\text{offset})>>k)<<k \quad \text{[Equation 2]}$$

In Equation 2, offset is applied to an original pMV and then downscaling is performed according to k, unlike Equation 1 of applying offset to a downscaled pMV.

The video encoding apparatus 1700 may search for the motion vector of the current block with the MVR of the current block, and obtain, as a residual motion vector, a difference between the motion vector of the current block and a selectively adjusted prediction motion vector.

The video encoding apparatus 1700 may determine the residual motion vector according to Equation 3 below and encode the residual motion vector. In Equation 3, MV is the motion vector of the current block, pMV' is the adjusted prediction motion vector, and MVD represents the residual motion vector.

$$MVD=MV-pMV' \quad \text{[Equation 3]}$$

When the MVR of the current block is greater than the minimum MVR, the video encoding apparatus 1700 may downscale the residual motion vector according to Equation 4, and generate a bit stream including information representing the downscaled residual motion vector.

$$MVD'=(MVD>>k) \quad \text{[Equation 4]}$$

In Equation 4, MVD' represents the downscaled residual motion vector, and k is a value according to the difference between the MVR of the current block and the minimum MVR, the k being equal to the k of Equation 1.

According to an embodiment, the video encoding apparatus 1700 may downscale the motion vector of the current block and the prediction motion vector (or the adjusted prediction motion vector) according to the k value, and then encode a difference between the two values as a residual motion vector.

According to an embodiment, the video encoding apparatus 1700 may calculate the downscaled residual motion vector according to Equation 5 below, instead of Equation 3 and Equation 4.

$$MVD'=(MV-pMV')/(R*S) \quad \text{[Equation 5]}$$

In Equation 5, MVD' represents the downscaled residual motion vector, MV is the motion vector of the current block, and pMV' is the adjusted prediction motion vector. Also, R is a pel unit value of the MVR of the current block, and is ¼ when the pel unit value of the MVR of the current block is a ¼ pel unit MVR. Also, S is an inverse number of the pel unit value of the minimum MVR, and S is 4 when the minimum MVR is a ¼ pel unit.

The video decoding apparatus 1900 may restore the motion vector of the current block by using the residual motion vector and at least one of information representing the MVR of the current block obtained from the bit stream and information representing the candidate block.

When the MVR of the current block is greater than the minimum MVR, the video decoding apparatus 1900 may adjust the prediction motion vector according to Equation 1 or Equation 2.

When the MVR of the current block is greater than the minimum MVR, the video decoding apparatus 1900 may upscale residual motion data according to Equation 6 below.

$$MVD''=(MVD'<<k) \quad \text{[Equation 6]}$$

In Equation 6, MVD' represents the residual motion vector downscaled in the encoding apparatus, and MVD" represents the upscaled residual motion vector. The k is a value determined according to a difference between the minimum MVR and the MVR of the current block, the k being equal to the k of Equation 1.

The video decoding apparatus 1900 may sum a prediction motion vector selectively adjusted according to a difference in magnitude between the minimum MVR and the MVR of the current block and a selectively upscaled residual motion vector to decode the motion vector of the current block.

According to an embodiment, the video decoding apparatus 1900 may determine the upscaled residual motion vector according to Equation 7 below, instead of Equation 6.

$$MVD''=MVD'*(R*S) \quad \text{[Equation 7]}$$

In Equation 7, MVD' represents the downscaled residual motion vector, R represents the pel unit value of the MVR of the current block, for example, ¼ when the pel unit value of the MVR of the current block is a ¼ pel unit MVR. Also, S is an inverse number of the pel unit value of the minimum MVR, and is 4 when the minimum MVR is a ¼ pel unit.

According to an embodiment, when the MVR of the current block is smaller than a 1 pel unit MVR, the video decoding apparatus 1900 may interpolate a reference image according to the minimum MVR, and then search for a prediction block according to the motion vector of the current block. Also, when the MVR of the current block is greater than or equal to the 1 pel unit MVR, the video decoding apparatus 1900 may search for a prediction block according to the motion vector of the current block without interpolating the reference image.

According to an embodiment, configuration information for a motion vector candidate list may be obtained from a bit stream by using a high-level syntax which is a group of information that is applied to a predefined data unit group.

The configuration information for the motion vector candidate list represents whether or not to use at least one of a candidate motion vector list for at least one candidate block of the current block and a motion vector list of predefined blocks respectively corresponding to candidate MVRs of the current block. The configuration information for the motion vector candidate list may be signaled by VLC or truncated unary coding.

More specifically, when the signaled configuration information for the motion vector candidate list is 0, both the candidate motion vector list for at least one candidate block of the current block and the motion vector list of the predefined blocks respectively corresponding to the candidate MVRs of the current block may be usable. When the signaled configuration information for the motion vector candidate list is 10, only the candidate motion vector list for at least one candidate block of the current block may be usable, and when the signaled configuration information for the motion vector candidate list is 11, only the motion vector list of the predefined blocks respectively corresponding to the candidate MVRs of the current block may be usable. The candidate motion vector list for the at least one candidate block may be a candidate motion vector list that is used in a skip processing mode, a direct processing mode, a merge processing mode, or an Adaptive Motion Vector Prediction (AMVP) processing mode that use candidate blocks being temporally or spatially adjacent to the current block.

According to another embodiment, the configuration information for the motion vector candidate list may represent whether to use the candidate motion vector list for the at least one candidate block of the current block.

According to another embodiment, the configuration information for the motion vector candidate list may represent only the motion vector list of the predefined blocks respectively corresponding to the candidate MVRs of the current block.

A method of configuring the motion vector list of the predefined blocks respectively corresponding to the candidate MVRs of the current block will be described with reference to FIGS. 27 and 28, later.

Figure 27:
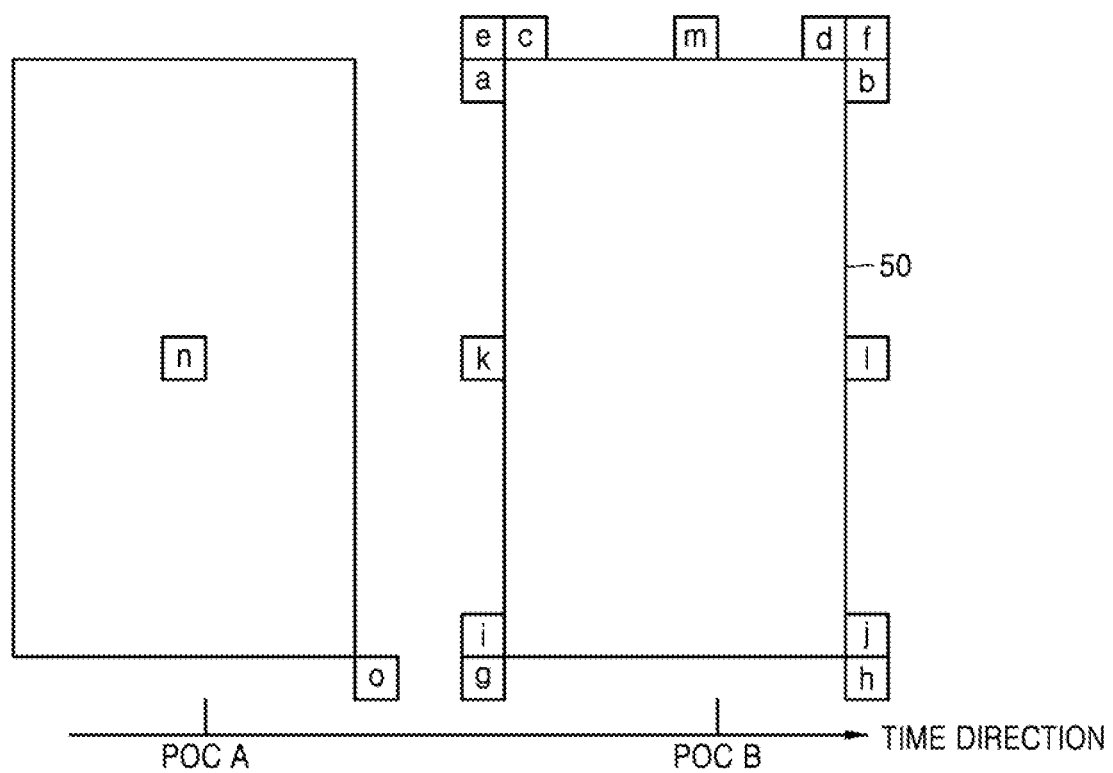
FIG. 27 illustrates at least one candidate block 1:1 mapped to at least one candidate MVR.

FIG. 27 is a view for describing at least one candidate block 1:1 mapped to each of at least one candidate MVR.

At least one candidate block selected from among spatial blocks and temporal blocks related to a current block may be mapped to each candidate MVR.

For example, the spatial blocks may include a left, upper block a, a right, upper block b, a upper, left block c, a upper, right block d, a left, upper, outer block e, a right, upper, outer block f, a left, lower, outer block g, a right, lower, outer block h, a left, lower block i, a right, lower block j, a left block k, a right block l, and a upper block m, which are blocks being adjacent to the current block 50. The temporal blocks may include a block n belonging to a reference image having a different POC from that of the current block 50 and located at the same position as the current block 50, and a block o being adjacent to the block n.

The at least one candidate block selected from among the spatial blocks and the temporal blocks may be mapped to each candidate MVR, and as shown in FIG. 28, a MVR of a ⅛ pel unit may be mapped to the left block k, a MVR of a ¼ pel unit may be mapped to the upper block m, a MVR of a ½ pel unit may be mapped to the left, upper block a, a MVR of a 1 pel unit may be mapped to the upper, left block c, and a MVR of a 2 pel unit may be mapped to the left, lower block i. The mapping relationship shown in FIGS. 27 and 28 is an example, and various other mapping relationships may be set.

FIG. 28 illustrates an example of a mapping relationship between at least one candidate motion vector resolution and at least one candidate block.

According to the example shown in FIG. 28, when the video encoding apparatus 1700 determines a MVR of a current block as a ⅛ pel unit, the video encoding apparatus 1700 may use a motion vector of a left block as a prediction motion vector of the current block. Also, when the video encoding apparatus 1700 uses a motion vector of a upper block as a prediction motion vector of the current block, the video encoding apparatus 1700 may determine a MVR of the current block as a ¼ pel unit.

Also, when the video decoding apparatus 1900 determines that a MVR of a current block is a ⅛ pel unit, the video decoding apparatus 1900 may use a motion vector of a left block as a prediction motion vector of the current block. Also, when the video decoding apparatus 1900 determines that a motion vector of a upper block is used as a prediction motion vector of a current block, the video decoding apparatus 1900 may determine a MVR of the current block as a ¼ pel unit.

According to an embodiment, a location of a candidate block that is mapped to each of at least one candidate MVR may be determined in the order of frequently selected prediction motion vectors when motion vectors of a predefined number of blocks in a picture are determined with a MVR of an arbitrary pel unit. For example, when a number of supportable candidate MVRs is 5, 5 blocks that are frequently selected as prediction motion vectors from among blocks including spatial blocks and temporal blocks may be mapped to the respective candidate MVRs.

According to an embodiment, when candidate MVRs are 1:1 mapped to candidate blocks, the candidate MVRs may be arranged in ascending order according to sizes of pel units, the candidate blocks may be arranged in descending order according to the numbers of times at which the candidate blocks are selected as prediction motion vectors, and then, the candidate MVRs may be 1:1 mapped to the candidate blocks respectively corresponding to rankings of the candidate MVRs.

Kinds and numbers of candidate MVRs being selectable for a current block may change according to information about at least one of the current block, a previously decoded block, a current tile, a previously decoded tile, a current slice, a previously decoded slice, a current picture, and a previously decoded picture.

Also, locations of candidate blocks respectively mapped to the candidate MVRs being selectable for the current block may change according to information about at least one of the current block, a previously decoded block, a current tile, a previously decoded tile, a current slice, a previously decoded slice, a current picture, and a previously decoded picture.

The kinds and numbers of candidate MVRs being selectable for a current block, and locations of candidate blocks respectively mapped to the candidate MVRs being selectable for the current block may be determined based on the same criterion by the video encoding apparatus 1700 and the video decoding apparatus 1900, and accordingly, although the video encoding apparatus 1700 encodes an index representing a MVR of a current block or an index representing a candidate block for the current block and transmits the index to the video decoding apparatus 1900, the video decoding apparatus 1900 may determine the MVR or the candidate block corresponding to the index.

According to an embodiment, the video encoding apparatus 1700 may determine whether to execute at least one processing mode of a plurality of processing modes included in at least one processing among prediction processing, transform processing, and filtering processing for encoding the current block, based on the motion vector resolution of the current block. Information about whether to execute the at least one processing mode may be encoded with a high-level syntax.

According to an embodiment, the video decoding apparatus 1900 may obtain information about whether to execute at least one processing mode based on the motion vector resolution of the current block from the plurality of processing modes included in at least one processing of prediction processing, transform processing, and filtering processing for decoding the current block, from a bit stream, by using the high-level syntax. The video decoding apparatus 1900 may decode the current block based on the information about whether to execute the at least one processing mode.

According to an embodiment, the information about whether to execute the at least one processing mode may include default setting changing information, and when the default setting changing information represents that whether to execute a processing mode changes, the information about whether to execute the at least one processing mode may be updated. Also, when the default setting changing information represents that whether to execute a processing mode does not change, the information about whether to execute the at least one processing mode may be maintained. More specifically, when the default setting changing information is 0, the information about whether to execute the at least one processing mode may be used as it is, and when the default setting changing information is 1, the information about whether to execute the at least one processing mode may be updated.

Referring to FIG. 25, the information about whether to execute the at least one processing mode may be classified according to temporal layers. More specifically, information about whether to execute at least one processing mode for the pictures 1 and 2 corresponding to the temporal layer 0, the picture 3 corresponding to the temporal layer 1, the pictures 4 and 7 corresponding to the temporal layer 2, and the pictures 5, 6, 8, and 9 corresponding to the temporal layer 3 may be determined as different values according to the temporal layers.

Also, when the default setting changing information represents that whether to execute a processing mode changes even on the same temporal layer, the information about whether to execute at least one processing mode may be updated. More specifically, information about whether to execute at least one processing mode for the picture 5 of the temporal layer 3 may be maintained at it is when information 0 indicating that whether to execute a processing mode is maintained is transmitted from the picture 6, and when information 1 indicating that whether to execute a processing mode changes is transmitted from the picture 7, the information about whether to execute at least one processing mode may be updated.

Processing modes including prediction processing, transform processing, and filtering processing for encoding and decoding a current block will be described with reference to FIG. 29, below.

Figure 29:
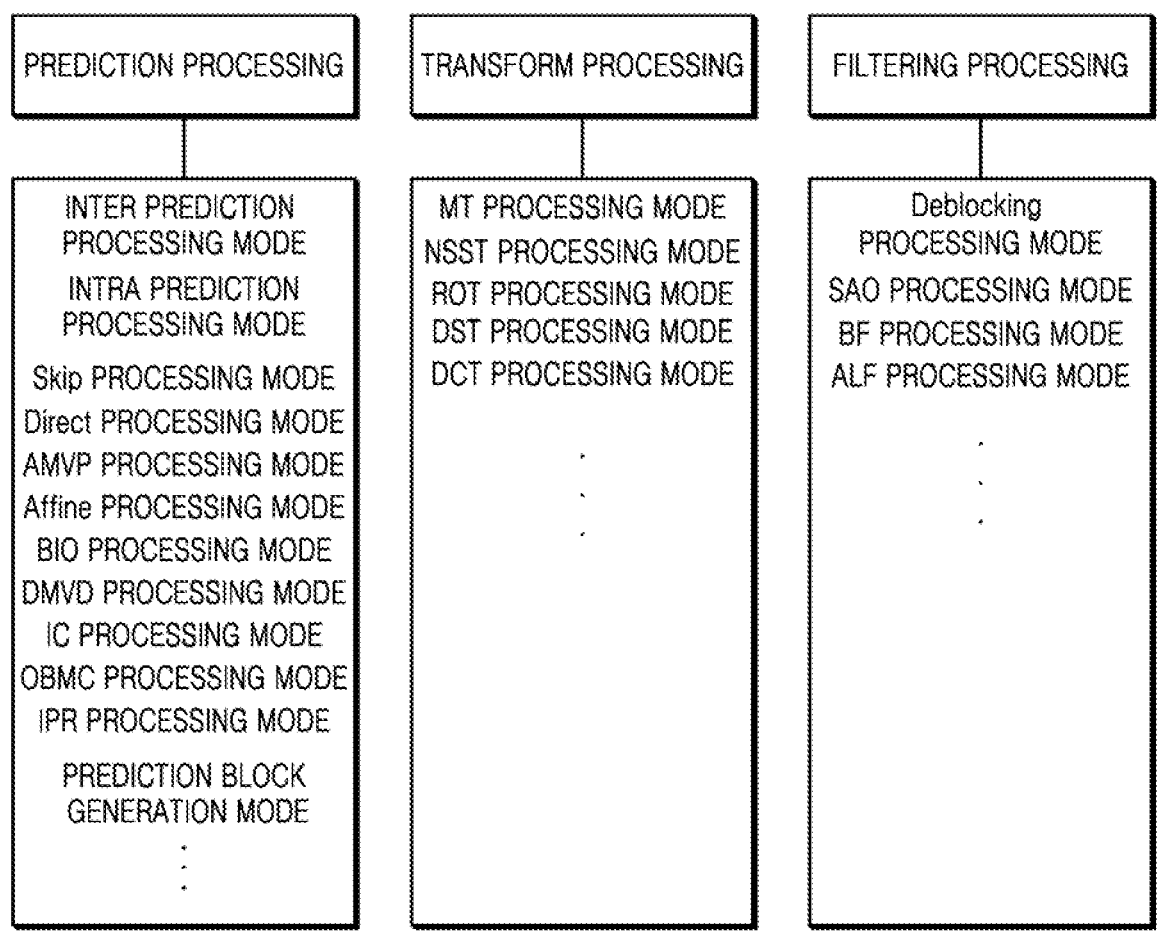
FIG. 29 illustrates processing modes respectively included in prediction processing, transform processing, and filtering processing.

FIG. 29 illustrates processing modes respectively included in prediction processing, transform processing, and filtering processing.

According to an embodiment, the prediction processing may include at least one of an inter prediction processing mode, an intra prediction processing mode, a skip processing mode, a direct processing mode, an AMVP processing mode, an affine processing mode, a Bi-Optical Flow (BIO) processing mode, a Decoder-side Motion Vector Derivation (DMVD) processing mode, an Illumination Compensation (IC) processing mode, an Overlapped Block Motion Compensation (OBMC) processing mode, an Inter Prediction Refinement (IPR) processing mode, and a prediction block generation mode.

According to an embodiment, the transform processing may include at least one of a Multiple Transform (MT) processing mode, a Non-Separable Secondary Transform (NSST) processing mode, a Rotational Transform (ROT) processing mode, a Discrete Sine Transforms (DST) processing mode, and a Discrete Cosine Transforms (DCT) processing mode.

According to an embodiment, the filtering processing may include at least one of a deblocking processing mode, a Sample Adaptive Offset (SAO) processing mode, a Bilateral Filter (BF) processing mode, and an Adaptive Loop Filter (ALF) processing mode.

First, the processing modes included in the prediction processing, the transform processing, and the filtering processing will be briefly described. For definite descriptions about the embodiments according to the disclosure, descriptions about detailed algorithms for the following processing modes will be omitted.

The inter prediction processing mode means a processing method using similarity between a current image and another image. A reference block that is similar to a current block of the current image may be detected from among reference images decoded earlier than the current image, and a prediction block may be determined from the reference block. A distance in coordinates between the current block and the prediction block may be represented as a motion vector, and differences between pixel values of the current block and pixel values of the prediction block may be represented as residual data. Accordingly, through inter prediction for the current block, by outputting an index indicating a reference image, a motion vector, and residual data, instead of directly outputting image information of the current block, encoding and decoding efficiency may be improved.

The intra prediction processing mode means a processing method using spatial similarity in an image. A prediction block that is similar to a current block may be generated from pixel values being adjacent to the current block, and differences between pixel values of the current block and pixel values of the prediction block may be represented as residual data. By outputting information about the prediction block generation mode and residual data, instead of directly outputting image information of the current block, encoding and decoding efficiency may be improved.

The skip processing mode may search for a reference block in a reference image by using motion information of an adjacent block as motion information of a current block. A prediction block determined from the reference block may be determined as the current block.

The direct processing mode is a method of the inter prediction processing mode, and may search for a reference block in a reference image by using motion information of an adjacent block as motion information of a current block, and determine a prediction block from the reference block. Then, the direct processing mode may restore the current block with a combination of residual data and the prediction block. The direct processing mode may be referenced as the merge processing mode.

The AMVP processing mode is a method of the inter prediction processing mode, and may sum a motion vector of an adjacent block and a residual motion vector to determine a motion vector of a current block, and search for a reference block corresponding to the motion vector in a reference image specified based on a reference image list and a reference image index. Then, the AMVP processing mode may restore the current block with a combination of a prediction block and residual data.

The affine processing mode represents processing of transforming or inverse-transforming a motion vector of a block representing a translation motion into a motion vector representing a rotation motion, zoom-in, or zoom-out.

The BIO processing mode represents sample-wise motion vector improvement processing that is performed with respect to block-wise motion compensation for bi-directional prediction.

The DMVD processing mode is technology of inducing a motion vector in a decoder side, and induces a motion vector of a current block through template matching or bilateral matching.

The IC processing mode is technology of increasing prediction efficiency by compensating for illumination of a current block and/or a reference block in a reference image to increase prediction efficiency when decoding the current block in the inter prediction processing mode.

The OBMC processing mode is technology of weighted-summing restored pixels at a current location by a motion of adjacent blocks and restored pixels of a current block to perform motion compensation.

The IPR processing mode is technology of changing pixel values of a prediction block determined from a reference image of a current block by using a linear model between a restored block and a prediction block.

The prediction block generation mode is a method of generating a prediction block of a current block in the inter prediction processing mode, and for example, the prediction block generation mode may include a plurality of different prediction block generation modes. The High Efficiency Video Coding (HEVC) discloses a total of 35 types of modes including a Intra_Planar mode, an Intra_DC mode, and an Intral_Angular mode, as prediction block generation modes.

The MT processing mode is technology of sequentially using a plurality of transform kernels to transform residual data in a spatial domain into residual data in a frequency domain, or inverse-transform residual data in a frequency domain into residual data in a spatial domain.

The NSST processing mode is transform technology that is performed between core transform and quantization and between dequantization and inverse core transform, and the NSST processing mode may be applied only to some area of a current block.

The ROT processing mode is technology of partially exchanging at least ones of rows and columns of a frequency coefficient matrix. Partially exchanging rows or columns may mean partially exchanging values of two rows or columns by using a specific function such as a trigonometrical function, not 1:1 exchanging values of specific rows or columns.

The DST processing mode is technology of transforming residual data in a spatial domain into residual data in a frequency domain or inverse-transforming residual data in a frequency domain into residual data in a spatial domain by using DST transform kernels.

The DCT processing mode is technology of transforming residual data in a spatial domain into residual data in a frequency domain or inverse-transforming residual data in a frequency domain into residual data in a spatial domain by using DCT transform kernels.

The deblocking processing mode is technology for improving a blocking artifact which is distortion generated at boundaries between blocks.

The SAO processing mode is technology of adding an offset to a restored sample to minimize an error between a restored image and an original image.

The BF processing mode is technology of replacing pixel values of a restored block with weighted averages of pixel values of a current block and pixel values of an adjacent block.

The ALF processing mode is technology of changing pixel values by using a filter selected from among a plurality of filters for each of a plurality of pixel groups included in a restored current block.

According to an embodiment, the order of determinations on whether to apply the processing modes shown in FIG. 29 may have been set in advance. When whether to apply a processing mode is determined according to a preset syntax, no determination on whether to apply the other processing modes may be made according the result of the determination. For example, after whether to apply the skip processing mode is determined in prediction processing, whether to apply a processing mode may be determined in the order of the inter prediction processing mode, the direct processing mode, and the AMVP processing mode. After whether to apply the skip processing mode is determined, whether to apply the inter prediction processing mode may be determined. When it is determined that the skip processing mode is applied, no determination on whether to apply the inter prediction processing mode, the direct processing mode, and the AMVP processing mode may be made. That is, acquisition of information related to the inter prediction processing mode, the direct processing mode, and the AMVP processing mode may be skipped.

According to an embodiment, when a processing mode that is applicable to a current block is specified based on a MVR of the current block, the video decoding apparatus 1900 may decode the current block in the specified processing mode.

According to an embodiment, the video decoding apparatus 1900 may determine a processing mode that is applicable to the current block, based on the MVR corresponding to the current block. The applicable processing mode may be a processing mode having probability of being applied to the current block, and the applicable processing mode may be actually applied to the current block or may be not applied to the current block according to information included in a bit stream. A non-applicable processing mode which will be described later means a processing mode having no probability of being applied to a current block.

The MVR of the current block may mean precision of a location of a pixel that may be indicated by a motion vector of the current block among pixels included in a reference image (or an interpolated reference image). The MVR of the current block may be selected from among at least one candidate MVR. The at least one candidate MVR may include at least one of, for example, a MVR of a ⅛ pel unit, a MVR of a ¼ pel unit, a MVR of a ½ pel unit, a MVR of a 1 pel unit, a MVR of a 2 pel unit, a MVR of a 4 pel unit, and a MVR of a 8 pel unit, although not limited thereto.

According to an implementation example, the candidate MVR may include only a MVR.

FIGS. 30 to 32 illustrate examples of applicable processing modes or non-applicable processing modes preset for MVRs.

Referring to FIG. 30, when a MVR of a current block is a ¼ pel unit, it may be determined that the affine processing mode is applicable to the current block, and when a MVR of a current block is a ½ pel unit, a 1 pel unit, or a 2 pel unit, it may be determined that the DMVD processing mode is applicable to the current block.

Referring to FIG. 31, when a MVR of a current block is a ¼ pel unit, it may be determined that the DST processing mode is non-applicable to the current block, and when a MVR of a current block is a ½ pel unit, a 1 pel unit, or a 2 pel unit, it may be determined that the ROT processing mode is non-applicable to the current block Also, referring to FIG. 32, when a MVR of a current block is a ¼ pel unit, it may be determined that the affine processing mode and the IC processing mode are applicable to the current block, and the BF processing mode is non-applicable to the current block. When a MVR of a current block is a ½ pel unit, a 1 pel unit, or a 2 pel unit, it may be determined that the ROT processing mode is applicable to the current block, and the OBMC processing mode and the SAO processing mode are non-applicable to the current block.

According to an embodiment, the video decoding apparatus 1900 may determine at least one applicable processing mode for a current block based on a motion vector of the current block, and obtain information about the applicable processing mode from a bit stream. The information about the applicable processing mode may include, for example, information about at least one of whether to apply a processing mode and detailed setting content related to the processing mode.

The video decoding apparatus 1900 may obtain the information about the applicable processing mode from the bit stream, and decode the current block based on the applicable processing mode. According to an embodiment, the video decoding apparatus 1900 may determine whether to apply the applicable processing mode to the current block based on the information obtained from the bit stream, and decode the current block in the applicable processing mode according to the result of the determination.

According to an embodiment, decoding the current block in the applicable processing mode does not mean applying only the applicable processing mode to the current block. According to an embodiment, the video decoding apparatus 1900 may process the current block according to another processing mode of which application needs to be determined earlier than the applicable processing mode, in a preset order, in other words, according to a preset syntax, and then apply the applicable processing mode to the current block. Alternatively, the video decoding apparatus 1900 may process the current block according to the applicable processing mode, and then decode the current block according to the other processing mode of which application is determined according to the preset syntax.

For example, when an applicable processing mode corresponding to a MVR is the affine processing mode, the video decoding apparatus 1900 may perform prediction processing on the current block according to the affine processing mode, and apply a processing mode included in transform processing and a processing mode included in filtering processing to the prediction-processed current block to decode the current block.

For example, when an applicable processing mode corresponding to a MVR is the SAO processing mode, the video decoding apparatus 1900 may apply the SAO processing mode to a current block to which both a processing mode of prediction processing and a processing mode of transform processing are applied, to decode the current block.

So far, various embodiments have been described. It will be apparent that those of ordinary skill in the technical art to which the disclosure belongs may readily make various modifications thereto without changing the essential features of the disclosure. Therefore, it should be understood that the disclosed embodiments described herein should be considered in a descriptive sense only and not for purposes of limitation. The scope of the disclosure is defined in the accompanying claims rather than the above detailed description, and it should be noted that all differences falling within the claims and equivalents thereof are included in the scope of the disclosure.

Meanwhile, the embodiments of the disclosure may be written as a program that is executable on a computer, and implemented on a general-purpose digital computer that operates a program using a computer-readable recording medium. The computer-readable recording medium may include a storage medium, such as a magnetic storage medium (for example, ROM, a floppy disk, a hard disk, etc.) and an optical reading medium (for example, CD-ROM, DVD, etc.).

The invention claimed is:

1. A video decoding method comprising:
   obtaining, from a bitstream, a motion vector difference resolution index;
   obtaining motion vector difference resolution set information;
   determining a motion vector difference resolution of a current block, based on the motion vector difference resolution index and the motion vector difference resolution set information;
   obtaining, from the bitstream, motion vector difference of the current block;
   adjusting the motion vector difference based on the motion vector difference resolution; and
   obtaining a motion vector of the current block by using a prediction motion vector and the adjusted motion vector difference,
   wherein the motion vector difference resolution set information indicates one motion vector difference resolution set among a plurality of motion vector difference resolution sets, the one motion vector difference resolution set including a plurality of motion vector difference resolutions, and
   wherein the plurality of motion vector difference resolutions are predetermined and the motion vector difference resolution index corresponds to one motion vector difference resolution among the plurality of motion vector difference resolutions.

2. The video decoding method of claim 1, wherein when the motion vector difference resolution is greater than a minimum motion vector difference resolution, the motion vector difference is adjusted based on a value corresponding to the motion vector difference resolution.

3. The video decoding method of claim 1, further comprising:
   determining a motion vector difference resolution set of a plurality of motion vector difference resolution sets, based on the motion vector resolution set information; and
   determining the motion vector difference resolution of the current block, based on the motion vector difference resolution set and motion vector difference resolution index.

4. A video encoding method comprising:
   performing motion prediction on a current block to determine a motion vector and a motion vector resolution of the current block;
   determining a prediction motion vector of the current block, based on the motion vector resolution;
   determining a motion vector difference of the current block by using the prediction motion vector of the current block; and
   encoding a motion vector difference resolution index and a motion vector difference set information, and encoding the motion vector difference of the current block,
   wherein the motion vector difference resolution set information indicates one motion vector difference resolution set among a plurality of motion vector difference resolution sets, the one motion vector difference resolution set including a plurality of motion vector difference resolutions, and
   wherein the plurality of motion vector difference resolutions are predetermined and the motion vector difference resolution index corresponds to one motion vector difference resolution among the plurality of motion vector difference resolutions.

5. A video decoding apparatus comprising:
   a memory; and
   at least one processor connected to the memory,
   wherein the at least one processor is configured to:
      obtain, from a bitstream, a motion vector difference resolution index;
      obtain motion vector difference resolution set information,
      determine a motion vector difference resolution of a current block based on the motion vector difference resolution index and the motion vector difference resolution set information;
      obtain, from the bitstream, motion vector difference of the current block,
      adjust the motion vector difference based on the motion vector difference resolution; and
      obtain a motion vector of the current block by using a prediction motion vector and the adjusted motion vector difference,
   wherein the motion vector difference resolution set information indicates one motion vector difference resolution set among a plurality of motion vector difference resolution sets, the one motion vector difference resolution set including a plurality of motion vector difference resolutions, and
   wherein the plurality of motion vector difference resolutions are predetermined and the motion vector difference resolution index corresponds to one motion vector difference resolution among the plurality of motion vector difference resolutions.

* * * * *